United States Patent
Kitayama et al.

(10) Patent No.: US 6,520,759 B2
(45) Date of Patent: *Feb. 18, 2003

(54) MANUFACTURING DEVICE OF FOAMED THERMOPLASTIC RESIN SHEET

(75) Inventors: Takeo Kitayama, Osaka (JP); Kaori Tsubouchi, Osaka (JP); Shigeyoshi Matsubara, Osaka (JP); Tatsuhiro Nagamatsu, Chiba (JP)

(73) Assignee: Sumitomo Chemical Company, Limited, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/220,068

(22) Filed: Dec. 23, 1998

(65) Prior Publication Data

US 2002/0048614 A1 Apr. 25, 2002

(30) Foreign Application Priority Data

Dec. 26, 1997 (JP) ............................................. 9-361345

(51) Int. Cl.⁷ ................................................. B29C 47/16
(52) U.S. Cl. ................... 425/4 C; 425/817 C; 425/466; 425/326.1
(58) Field of Search ............................. 425/817 C, 4 C, 425/466, 297, 326.1, 72.1

(56) References Cited

U.S. PATENT DOCUMENTS

| | | | | |
|---|---|---|---|---|
| 3,222,722 A | * | 12/1965 | Reifenhauser | 425/112 |
| 3,966,381 A | | 6/1976 | Suh | 425/376 |
| 4,017,245 A | * | 4/1977 | Lang | 425/817 C |
| 4,154,563 A | * | 5/1979 | Johnson | 425/817 C |
| 4,278,624 A | * | 7/1981 | Kornylak | 425/4 C |
| 4,292,019 A | * | 9/1981 | Hay et al. | 425/325 |
| 4,399,086 A | * | 8/1983 | Walter | 425/325 |
| 4,469,652 A | | 9/1984 | Cisar et al. | 425/817 C |
| 4,556,375 A | * | 12/1985 | Hancock | 425/127 |
| 4,626,183 A | | 12/1986 | Shirai et al. | 425/68 |
| 4,781,569 A | * | 11/1988 | Kinugasa et al. | 425/504 |
| 4,911,978 A | * | 3/1990 | Tsubone et al. | 264/321 |
| 6,027,629 A | * | 2/2000 | Hisamoto et al. | 428/304.4 |

FOREIGN PATENT DOCUMENTS

| | | |
|---|---|---|
| DE | 25 46 583 | 4/1977 |
| DE | 29 04 720 | 8/1980 |
| DE | 31 26 125 | 12/1982 |
| EP | 0 002 489 | 6/1979 |
| EP | 0 013 816 | 8/1980 |
| EP | 0 026 554 | 4/1981 |
| EP | 0 256 754 | 2/1988 |
| EP | 0 260 949 | 3/1988 |
| EP | 0 492 644 | 7/1992 |
| JP | 55-2045 | 1/1980 |
| JP | 57-63230 | 4/1982 |
| JP | 59-41235 | 3/1984 |
| JP | 59-62122 | 4/1984 |
| JP | 8-231745 | 9/1996 |

* cited by examiner

Primary Examiner—Jan H. Silbaugh
Assistant Examiner—Thu Khanh T. Nguyen
(74) Attorney, Agent, or Firm—Sughrue Mion, PLLC

(57) ABSTRACT

A foamed thermoplastic resin sheet manufacturing device is provided with (i) an extruder for melting and kneading a thermoplastic resin and a foaming agent to form a melted/kneaded mixture and extruding the melted/kneaded mixture, (ii) a die which is provided at a front end of said extruder and forms the melted/kneaded mixture into a sheet-like foamy thermoplastic resin material, (iii) a vacuum chamber in which the foamy thermoplastic resin material extruded through said die expands under a reduced pressure, and (iv) a facing-wall section composed of a pair of walls of said vacuum chamber which face each other in a thickness direction of the foamy thermoplastic resin material, at least one of the walls in pair being a movable wall provided so as to move in directions in which said walls approach and separate each other. By this arrangement, foamed thermoplastic resin sheets with various thicknesses can be produced.

24 Claims, 12 Drawing Sheets

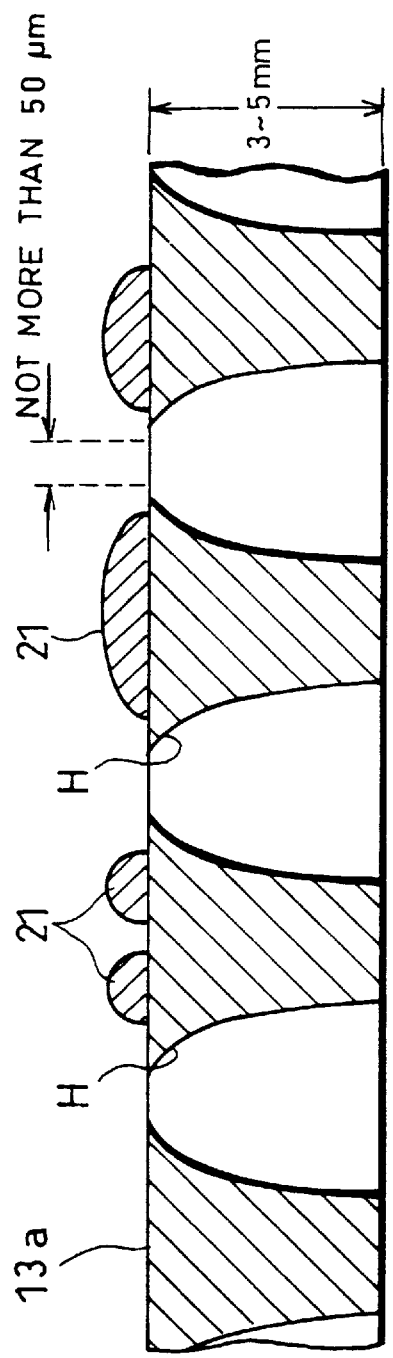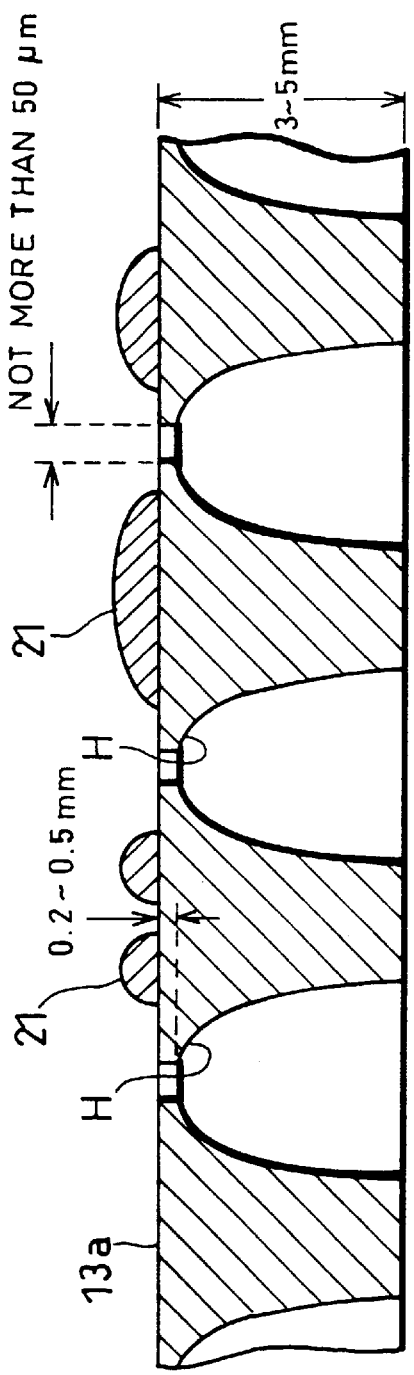

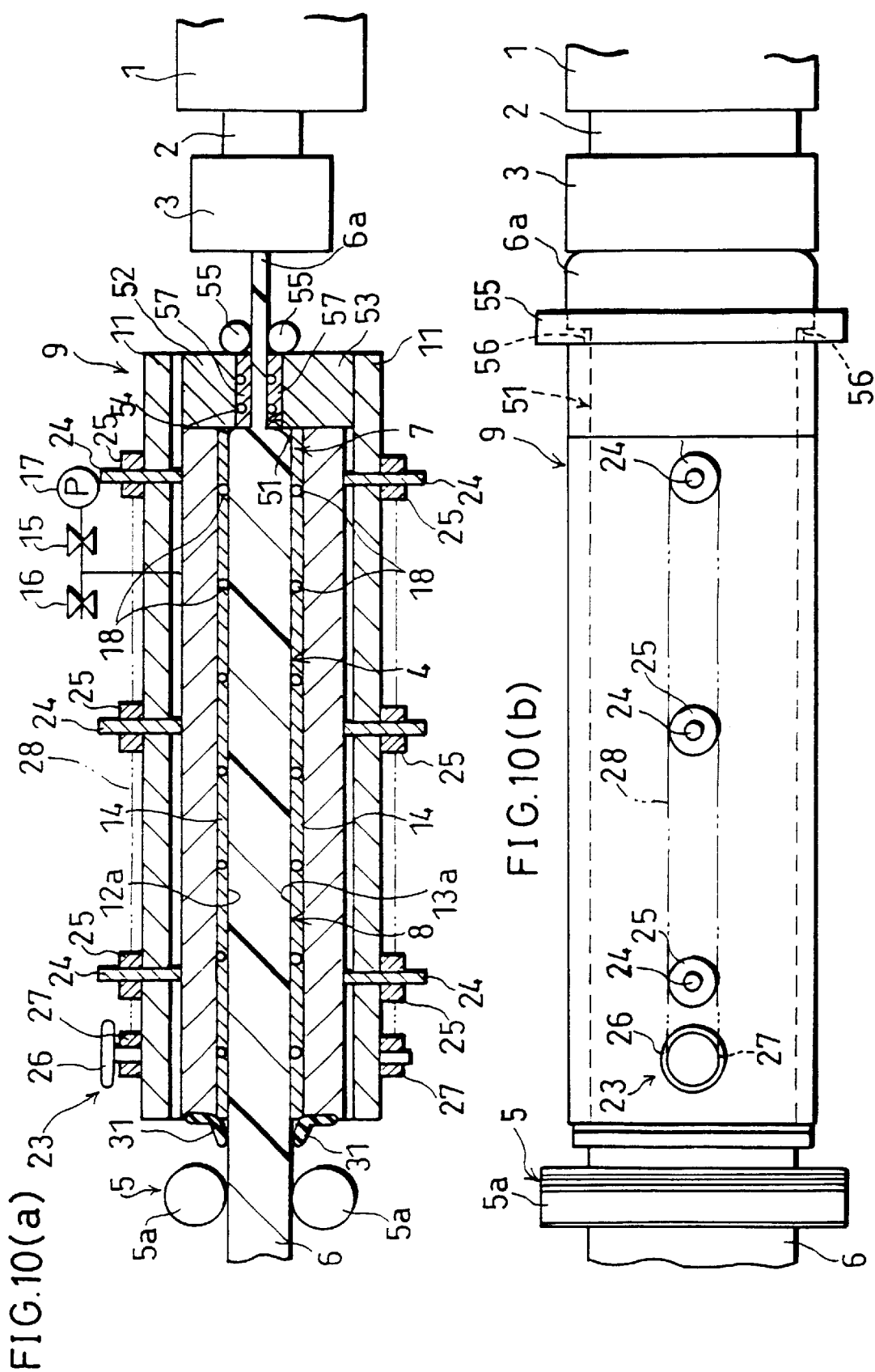

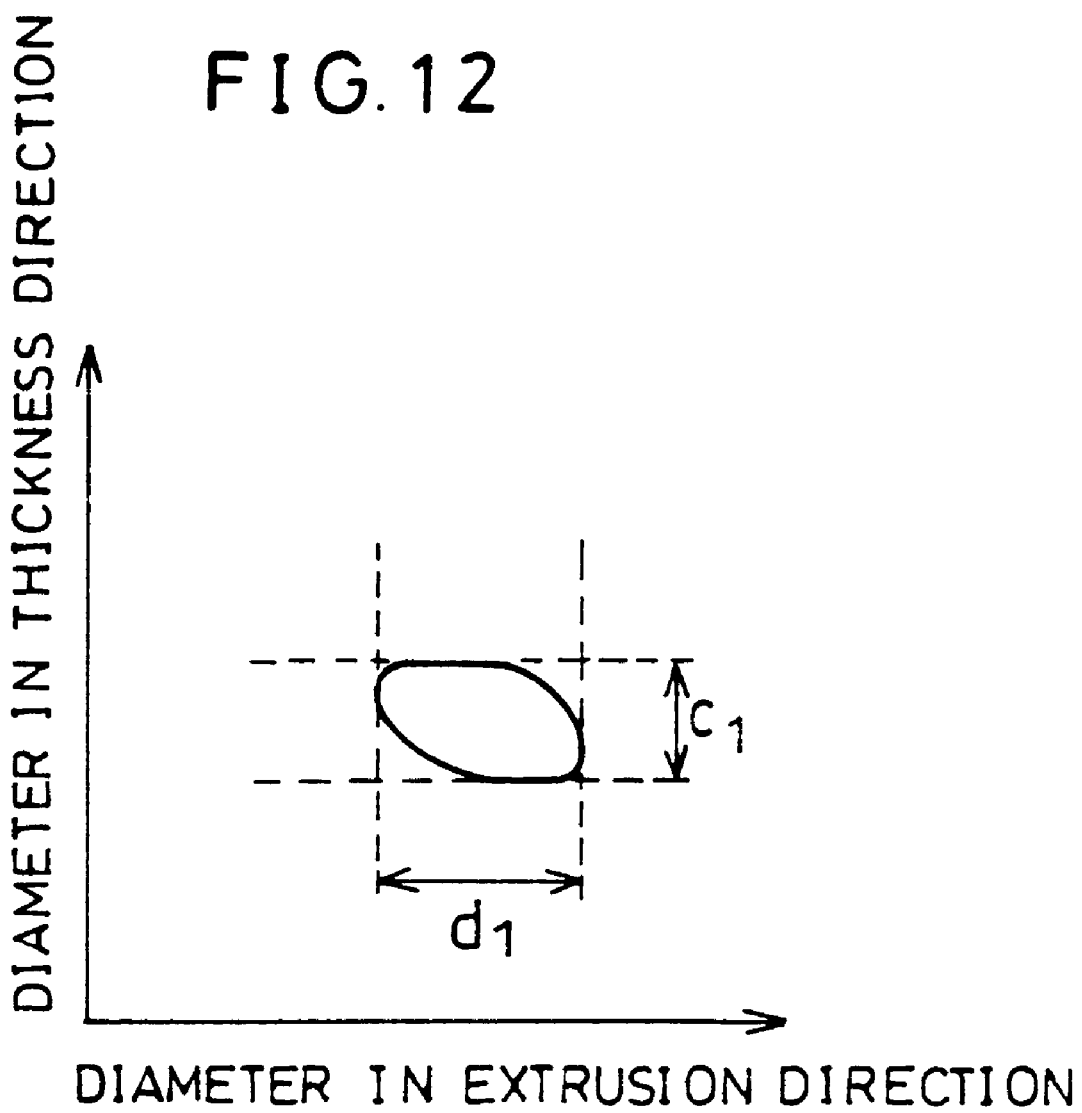

MANUFACTURING DEVICE OF FOAMED THERMOPLASTIC RESIN SHEET

FIELD OF THE INVENTION

The present invention relates to a foamed thermoplastic resin sheet manufacturing device which performs expansion under a reduced pressure.

BACKGROUND OF THE INVENTION

As a conventional method for producing a foamed thermoplastic resin sheet (hereinafter sometimes referred to simply as "sheet"), a manufacturing method wherein a thermoplastic resin and a foaming agent are melted and kneaded in an extruder and extruded through a die into under the atmospheric pressure has been well known. To obtain a highly foamed sheet by this manufacturing method, however, there are inconveniences that a great amount of a foaming agent is needed, and that cells become more coarse as the sheet expands, thereby deteriorating a strength of the sheet.

As a method which has such inconveniences solved, a method in which the foamy thermoplastic resin material extruded from an extruder is passed through a vacuum device so that the foamy thermoplastic resin is further expanded has been practiced.

For example, the Japanese Publication for Laid-Open Patent Application No. 54215/1990 (Tokukohei 2-54215) (the Japanese Patent No. 1639854) discloses an arrangement wherein a roll-like haul-off machine is installed in a vacuum chamber so that the sheet-like foamy thermoplastic resin material is extruded through a die to the vacuum chamber so as to expand and the material thus foamed is hauled by the haul-off machine.

The Japanese Examined Patent Publication 29328/1983 (The Japanese Patent No. 1199174) discloses an arrangement in which a sealing member for ensuring reduction of a pressure in a vacuum chamber is provided at an outlet of the vacuum chamber and a roll-like haul-off machine is installed behind the vacuum chamber so as to haul a sheet-like foamy thermoplastic resin material which is extruded through a die to the vacuum chamber thereby expanding.

Incidentally, in the present specification, a thermoplastic resin expanded under a reduced pressure at a first expansion stage is referred to as "foamy thermoplastic resin," and the foamed thermoplastic resin further expanded under the reduced pressure to a completely expanded state, obtained after or immediately before curing, is referred to as "foamed thermoplastic resin." A thermoplastic resin in a state of being expanded under a reduced pressure is to be classified as the former "foamy thermoplastic resin."

By the conventional arrangements described above, foamed thermoplastic resin sheets with only one thickness are produced. Therefore, to produce foamed thermoplastic resin sheets with various thicknesses, a discrete manufacturing device has to be prepared for each thickness.

The manufacturing device disclosed by Tokukohei 2-54215, however, has a drawback in that installment of the haul-off machine in the vacuum chamber causes the sealing mechanism in the vacuum chamber to become complicated, and makes the manufacturing device bulkier.

Further, regarding the manufacturing method disclosed by Tokukosho 58-29328, since the foamed sheet, while being hauled by the haul-off machine, pushes the sealing member at the outlet of the manufacturing device, cells in the foamed sheet are crushed and surfaces of the sheet are scarred. Note that the drawback in that cells of the foamed sheet are crushed is more remarkable in the case of Tokukohei 2-54215.

Therefore, though usually cells growing long in the thickness direction of the sheet are obtained in the case of expansion under a reduced pressure, such an effect of growth of cells due to pressure reduction is not sufficiently achieved in the foregoing prior art, and cells emerging in this case are cells growing long in the direction orthogonal to the sheet thickness direction, that is, in the sheet width direction or in the extrusion direction, like in the aforementioned case. Presence of a number of such cells in a sheet leads to a problem that the sheet cannot be made thicker.

SUMMARY OF THE INVENTION

The present invention was made in light of the foregoing problems, and the object of the present invention is to provide a manufacturing device of a foamed thermoplastic resin sheet which is capable of manufacturing foamed thermoplastic resin sheets with various thicknesses.

To achieve the foregoing object, a manufacturing device of a foamed thermoplastic resin sheet of the present invention is characterized by comprising (i) an extruder for melting and kneading a thermoplastic resin and a foaming agent to form a melted/kneaded mixture, and extruding the melted/kneaded mixture, (ii) a die provided at a front end of the extruder, for forming the melted/kneaded mixture into a sheet-like foamy thermoplastic resin material, (iii) a vacuum chamber in which the foamy thermoplastic resin material extruded through the die expands under a reduced pressure, and (iv) a facing-wall section composed of a pair of walls of the vacuum chamber which face each other in a thickness direction of the foamy thermoplastic resin material, at least one of the walls being a movable wall provided so as to move in directions in which the walls approach and separate each other.

With the foregoing arrangement, the melted/kneaded mixture of the thermoplastic resin and the foaming agent is extruded through the die by an extruding operation by the extruder, thereby becoming a sheet-like foamy thermoplastic resin material. The foamy thermoplastic resin material further expands under a reduced pressure in the vacuum chamber, thereby becoming the formed thermoplastic resin sheet.

Here, the thickness of the foamed thermoplastic resin sheet is determined depending on a dimension of the vacuum chamber in the foamed thermoplastic resin sheet thickness direction. In other words, the foamed thermoplastic resin sheet expands to a thickness equivalent to the dimension of the vacuum chamber in the foamed thermoplastic resin sheet thickness direction.

On the other hand, in the facing-wall section composed of a pair of walls of the vacuum chamber which face each other in the thickness direction of the foamy thermoplastic resin material, at least one of the walls is a movable wall provided so as to move in directions in which the walls approach and separate each other. Therefore, the thickness of the foamed thermoplastic resin sheet in the vacuum chamber can be changed by moving the movable wall, and as a result, the foamed thermoplastic resin sheet can be formed to various thicknesses.

Another object of the present invention is to provide a manufacturing device of a foamed thermoplastic resin sheet which is capable of producing a thick sheet whose surface condition is excellent and whose good foaming state under a reduced pressure is maintained thereby ensuring a high foaming ratio.

To achieve the foregoing object, a manufacturing device of a foamed thermoplastic resin sheet of the present invention, arranged as above, is further arranged as follows.

Namely, a sealing member is provided at least on the movable wall in the facing-wall section, at an outlet of the vacuum chamber, so as to seal a space between the wall and a foamed thermoplastic resin sheet which is obtained as a result of expansion of the foamy thermoplastic resin material under a reduced pressure and comes out of the vacuum chamber.

The foregoing arrangement ensures that a set desired pressure is kept in the vacuum chamber, without a great force applied from the sealing members to the foamy thermoplastic resin material and the foamed thermoplastic resin sheet, at all times since the start of pressure reduction.

For example, the gap between the walls in pair of the facing-wall section is narrowed in a period prior to pressure reduction in the vacuum chamber, i.e., when expansion of the sheet-like foamy thermoplastic resin material due to pressure reduction does not yet start and the material has a small thickness, whereas the gap is widened after the pressure reduction in the vacuum chamber starts thereby causing the sheet-like foamy thermoplastic resin material to expand due to the reduced pressure and have a greater thickness, that is, when the sheet-like foamy thermoplastic resin material becomes the foamed thermoplastic resin sheet. Therefore, before and after the start of the pressure reduction in the vacuum chamber, the respective relationships between the walls and the sheet-like foamy thermoplastic resin material or the foamed thermoplastic resin sheet, that is, the respective position relationship between the sealing members and the sheet-like foamy thermoplastic resin material or the foamed thermoplastic resin sheet in the thickness direction of the sheet-like material (or sheet) can be maintained substantially unchanged. This allows the sealing members to be made of a soft and flexible material, and the sealing members thus formed by no means scar the surfaces of the foamed thermoplastic resin sheet, nor crush cells in the foamed thermoplastic resin sheet.

In contrast, by an arrangement in which the facing-wall section does not have a movable wall, it is required to make the sealing members of a material with a relatively high rigidity so as to maintain a desirably reduced pressure in the vacuum chamber before and after a change of the thickness of the sheet due to expansion under the reduced pressure. In this case, an excessively great force is applied from the sealing members to the foamed thermoplastic resin sheet with a greater thickness due to expansion under the reduced pressure, whereby the surfaces of the foamed thermoplastic resin sheet tend to be scarred by the sealing members, or cells in the sheet tend to be crushed.

Consequently, with a simple arrangement of the present invention in which sealing members are provided as sealing means for maintaining the reduced pressure in the vacuum chamber, a sheet whose surface is not scarred by the sealing members and which maintains a good foaming state under a reduced pressure thereby having a high foaming ratio and being formed thick can be easily obtained.

For a fuller understanding of the nature and advantages of the invention, reference should be made to the ensuing detailed description taken in conjunction with the accompanying drawings.

BRIEF DESCRIPTION OF THE DRAWINGS

FIG. 3(a) is a schematic vertical cross-sectional view illustrating a shape of POROUS ELECTROCAST which is adaptable as a porous material used in an expanding zone and a cooling zone shown in FIG. 1(a), as well as illustrating how a surface of the same is made uneven.

FIG. 3(b) is a schematic vertical cross-sectional view illustrating another example of the arrangement shown in FIG. 3(a).

FIG. 10(a) is a schematic vertical cross-sectional view illustrating an arrangement of a foamed thermoplastic resin sheet manufacturing device in accordance with still another embodiment of the present invention.

FIG. 10(b) is a plan view of the same.

FIG. 12 is an explanatory view illustrating a method for measuring cell diameters of a foamed thermoplastic resin sheet produced by the manufacturing device shown in FIG. 1(a) in accordance with an example of the present invention.

DESCRIPTION OF THE PREFERRED EMBODIMENTS

[First Embodiment]

The following description will explain an embodiment of the present invention while referring to FIGS. 1 through 6.

Figure 1:
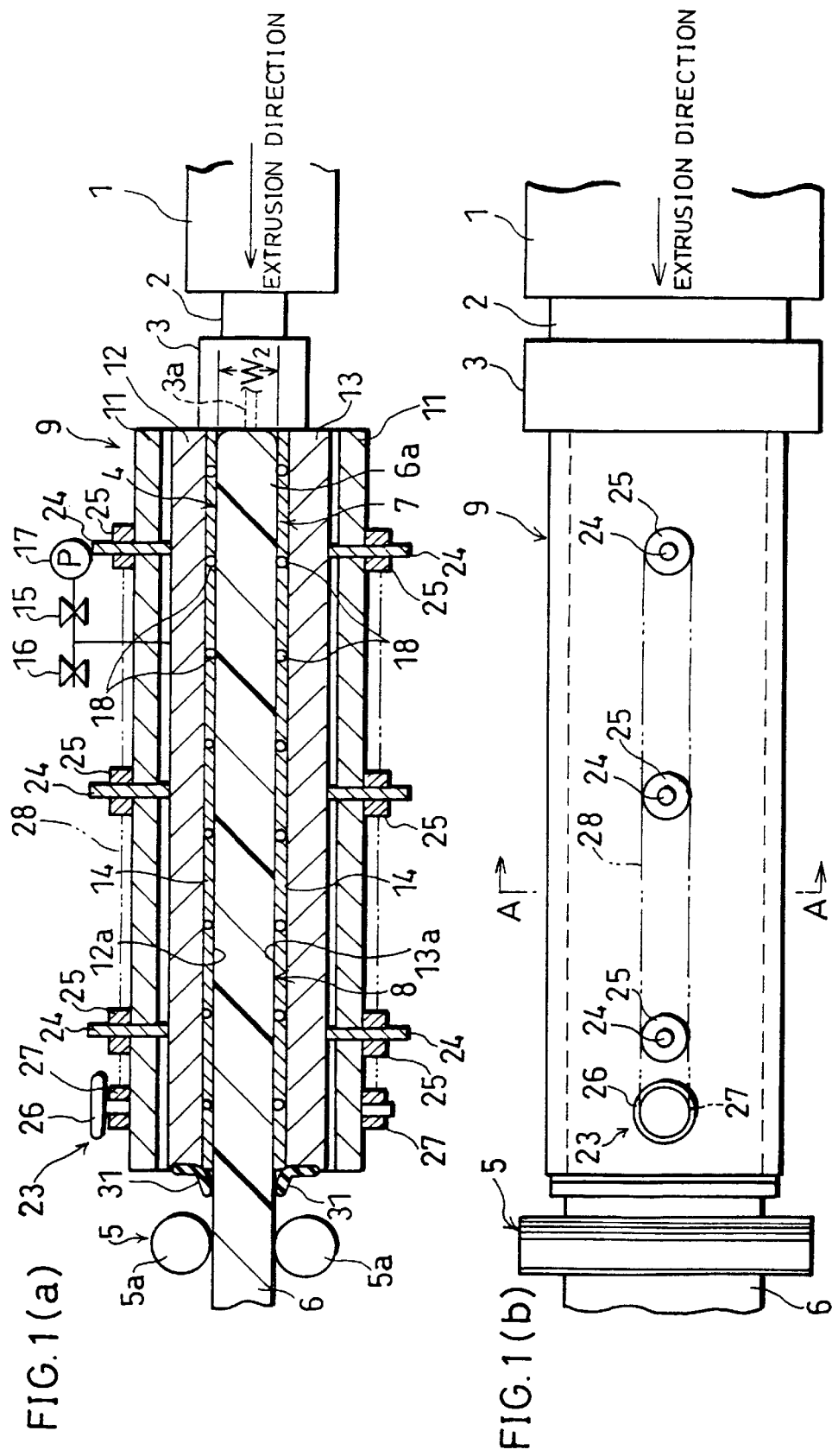
FIG. 1(a) is a schematic cross-sectional view illustrating an arrangement of a foamed thermoplastic resin sheet manufacturing device in accordance with an embodiment of the present invention.
FIG. 1(b) is a plan view of the same.

A manufacturing device of the foregoing foamed thermoplastic resin sheet 6 is equipped with an extruder 1, a head part 2, a die 3, a vacuum chamber 4, and a haul-off machine 5, as shown in FIG. 1(*a*). The vacuum chamber 4 is installed inside a molding section 9.

The extruder 1 melts and kneads a foaming agent and a thermoplastic resin at a temperature previously set suitable to the thermoplastic resin and the foaming agent used, and extrudes the mixture obtained toward the head part 2. It is preferable that the extruder 1 has a single shaft structure, in the case where the foaming agent and the thermoplastic resin are kneaded at a low temperature.

The temperature of the extruder 1 is set, for example, in the case where the thermoplastic resin used is polypropylene resin, so that a temperature of a melt of polypropylene resin (kneaded material) as a foamy thermoplastic resin material is not higher than 180° C. in the vicinity of an outlet of the extruder 1. This is because outgassing occurs when the temperature of the melt of the polypropylene resin exceeds 180° C.

The head part 2 is positioned at the outlet of the extruder 1, and a screen mesh usually used for molding by extrusion is used. In the case where, however, the thermoplastic resin used is a resin characterized by remarkable temperature rise when being shorn, a screen mesh is not used.

The die 3 is a sheet die for processing the foamy thermoplastic resin material extruded from the extruder 1 through the head part 2 into a sheet form. Generally, the sheet die is arranged so that temperature and pressure are adjustable. The die 3 has a die lip 3*a* as an outlet through which the resin is discharged.

The haul-off machine 5 positioned on a side to an outlet of the vacuum chamber 4 so as to haul the foamed thermoplastic resin sheet 6 through the outlet of the vacuum chamber 4. The haul-off machine 5 is composed of not less than one pair of rolls 5*a* facing each other so as to be capable of nipping the foamed thermoplastic resin sheet 6 therebetween. The rolls 5*a* are movably provided in directions such that a gap therebetween is narrowed and widened. For example, the rolls 5*a* are movably provided so as to move as a movable upper wall 12 and a movable lower wall 13 which will be described later move. Incidentally, each roll 5*a* is preferably arranged so that a temperature thereof is adjustable by cooled water. In the place of the roll-type haul-off machine 5, another type haul-off machine (for example, a belt-type one) conventionally used in manufacture of resin sheets may be used.

A hauling speed of the haul-off machine 5 should be appropriately set according to a foaming ratio, a thickness, a resin composition, and the like of the foamed thermoplastic resin sheet 6, but usually it is set to 1 to 3 m/min.

The vacuum chamber 4 is used for further expanding the sheet-like foamy thermoplastic resin material (hereinafter referred to as sheet-like foamy thermoplastic resin material 6*a*, so as to be distinguished from the foamed thermoplastic resin sheet 6 in the completely expanded stage) extruded from the die 3 under a reduced pressure. The vacuum chamber 4 has such a structure as is capable of cooling the sheet-like foamy thermoplastic resin material 6*a* after further expanding the sheet-like foamy thermoplastic resin material 6*a*.

An inlet side part of the vacuum chamber 4 is an expanding zone 7 in which the sheet-like foamy thermoplastic resin material 6*a* extruded from the die 3 is expanded under a reduced pressure, and an outlet side part thereof is a cooling zone 8 in which the sheet-like foamy thermoplastic resin material 6*a* expanded in the expanding zone 7 is cooled so as to be cured. Incidentally, there is no need to strictly separate the expanding zone 7 and the cooling zone 8 with use of a separating board or the like. The expanding zone 7 has a pressure not higher than that of the cooling zone 8, and also has a function of cooling the sheet-like foamy thermoplastic resin material 6*a* after expanding it. The cooling zone 8 is a zone in which the sheet-like foamy thermoplastic resin material 6*a* is cured.

Evacuation of the vacuum chamber 4 is carried out by a vacuum pump 17 connected to the expanding zone 7, through inner walls 14 having vacuum ports, which are provided in the expanding zone 7 and the cooling zone 8. The inner walls 14 will be described later. Adjustment of the reduced pressure is conducted by a pressure regulator 15 and a vacuum breaker 16. In adjustment of the reduced pressure, the pressure regulator 15 and the vacuum breaker 16 may be used in combination, or alternatively, one of them may be used. Here, the expanding zone 7 and the cooling zone 8 are evacuated by one evacuating pump 17 at the same time, but alternatively, another evacuating pump 17 may be provided to the cooling zone 8 so that pressures of the zones 7 and 8 are independently adjusted. In addition, it is preferable that each evacuating line is equipped with a pressure adjusting valve so that the reduced pressure can be adjusted. Applicable as the pressure adjusting valve is a generally-used type, such as a type which controls an inlet pressure of the evacuating pump 17 by changing an aperture thereof with use of a pressure detector and a pressure transmitter, or that of a type which per se controls the pressure by monitoring a pressure gauge.

Regarding pressure in the vacuum chamber 4, a differential pressure of about 200 mmHg (a difference from the atmospheric pressure) is required in the case where the thermoplastic resin used is for example polypropylene resin. The differential pressure is preferably set not less than 300 mmHg, or more preferably 350 to 700 mmHg. An optimal pressure, however, varies depending on the thermoplastic resin and the foaming agent used, and also varies with a desired foaming ratio of the foamed thermoplastic resin sheet 6.

The following description will explain the molding section 9 and the vacuum chamber 4 in more detail.

Figure 2:
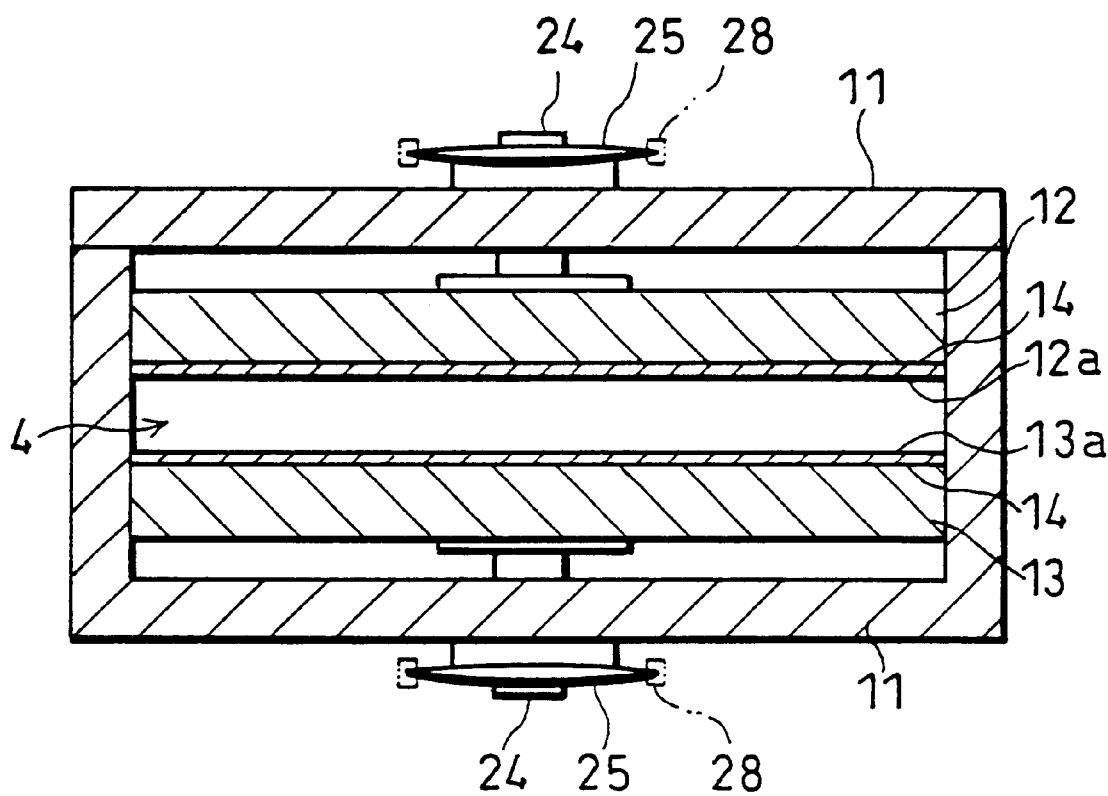
FIG. 2 is a schematic cross-sectional view taken along an A—A arrow line in FIG. 1(b).
Figure 4:
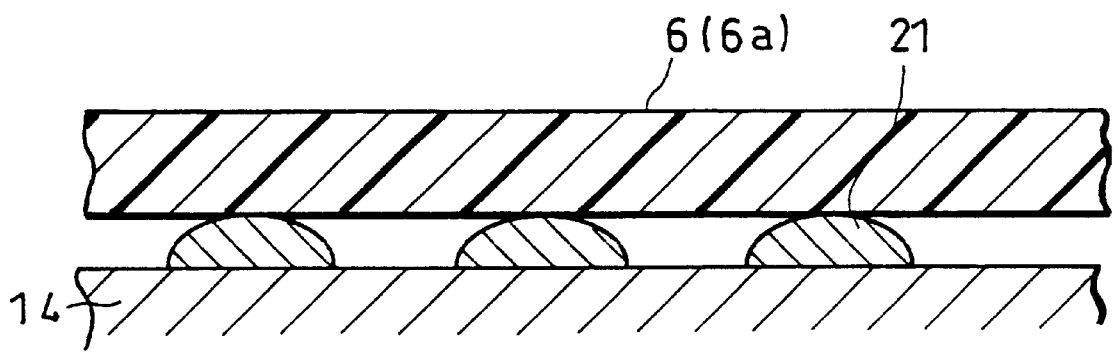
FIG. 4(a) is a schematic vertical cross-sectional view illustrating another example of a manner how to make the surface uneven as shown in FIG. 3(a).
FIG. 4(b) is a schematic vertical cross-sectional view illustrating still another example of a manner how to make the surface uneven as shown in FIG. 3(a).
Figure 4:
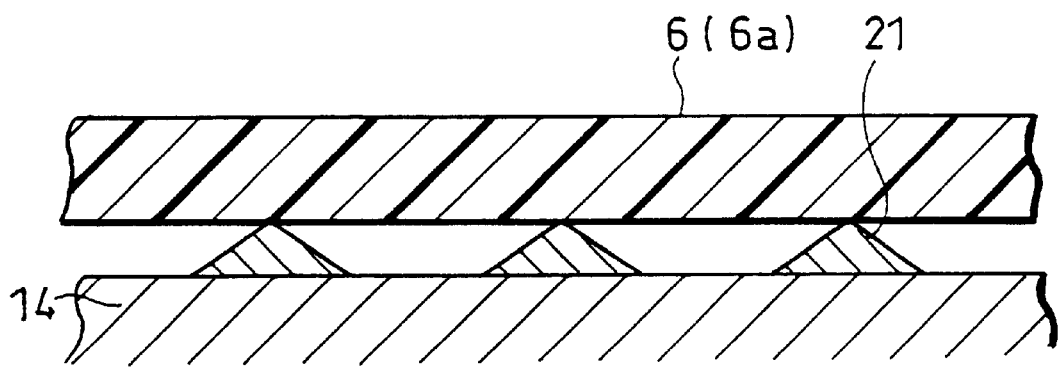

As shown in FIG. 1(*a*) and FIG. 2 which is a view (the sheet-like foamy thermoplastic resin material 6*a* is omitted) of a cross section taken along an A—A arrow line in FIG. 1(*b*), the molding section 9 includes the movable upper wall 12 and the movable lower wall 13 which are vertically movable, in a space enclosed by outer walls 11 in a box-like form. The space enclosed by the movable upper and lower walls 12 and 13 and the outer walls 11 constitutes the vacuum chamber 4. In the present embodiment, a wall surface 12*a* which is a lower surface of the movable upper wall 12 and a wall surface 13*a* which is an upper surface of the movable lower wall 13 are plane. The movable upper wall 12 and the movable lower wall 13 have the inner walls 14 on their sides to the vacuum chamber 4, and surfaces of the inner walls 14 constitute the aforementioned wall surfaces 12*a* and 13*a*, respectively.

The molding section 9 is equipped with a movable wall driving device 23 for moving the movable upper wall 12 and the movable lower wall 13. The movable wall driving device 23 has a plurality of screws 24 which vertically pierce the outer wall 11, and ends of the screws 24 are fixed to an upper surface of the movable upper wall 12. Portions of the screws 24 projecting from the outer wall 11 are fit to internal threads (not shown) formed in sprockets 25. The sprockets 25 are rotatably provided on an outer surface of the outer wall 11. On the outer surface of the outer wall 11, there is provided a handle 26 which is rotatable, and a sprocket 27 is made rotatable by the handle 26. To the sprockets 25 and 27, a belt 28 with teeth is applied, as shown in FIG. 1(b). The belt 28 may be substituted by a chain.

On the lower side of the movable lower wall 13, likewise, there are provided screws 24, sprockets 25, a sprocket 27, and a belt 28. On the lower side, however, no handle 26 is provided, and rotation of the handle 26 on the upper side is transmitted to the sprocket 27 on the lower side by a drive transmitting mechanism not shown. Alternatively, however, an independent movable wall driving device 23 identical to that on the upper side may be provided on the lower side as well, so that the movable upper wall 12 and the movable lower wall 13 are independently moved by the handles 26, respectively, i.e., by the movable driving devices 23, respectively.

With the aforementioned arrangement, the movable upper wall 12 and the movable lower wall 13 are simultaneously moved upward/downward by rotating the handle 26. In this case, the movable upper wall 12 and the movable lower wall 13 are moved in opposite directions. Thus, a gap between the wall surface 12a of the movable upper wall 12 and the wall surface 13a of the movable lower wall 13, that is, a height of the vacuum chamber 4 equivalent to a thickness of the foamed thermoplastic resin sheet 6 is adjustable.

Incidentally, movement of the movable upper wall 12 and the movable lower wall 13 is preferably performed in a state in which the movable upper and lower walls 12 and 13 slant in neither the extrusion direction nor the width direction of the foamed thermoplastic resin sheet 6, being parallel with each other at all times.

Furthermore, in the present embodiment, the wall surface 12a of the movable upper wall 12 and the wall surface 13a of the movable lower wall 13 move equal distances, respectively, with respect to a central position of the foamed thermoplastic resin sheet 6 in the thickness direction at the die lip 3a.

Furthermore, an arrangement of the upper wall driving device 23 is not limited to the foregoing screw type. Known arrangements, such as an arrangement in which hydraulic cylinders are used, may be adapted. The foregoing screw type is suitable to a small-scale manufacturing device, while the hydraulic cylinder type is suitable to a large-scale manufacturing device.

Furthermore, in the present embodiment, the movable upper and lower walls 12 and 13 are provided, but alternatively, only one of them may be movably provided.

On edges of the movable upper and lower walls 12 and 13 on the vacuum chamber 4 outlet side, blade-like sealing members 31 are provided, respectively. The sealing members 31 are provided on the movable upper and lower walls 12 and 13, respectively, for example, from a right or left end to the other end on each wall edge. The sealing members 31 seal the vacuum chamber 4 so that reduction of pressure in the vacuum chamber 4 is ensured. In a state in which the sheet-like foamy thermoplastic resin material 6a or the foamed thermoplastic resin sheet 6 are present between the sealing members 31, the sealing members 31 curve or bend in a transport direction of the same. The sealing members 31 are soft and flexible, made of, for example, rubber.

Another sealing member 31 may also be provided in the thickness direction of the foamed thermoplastic resin sheet 6 on both sides to the edges of the sheet 6, in addition to the foregoing positions. The sealing members 31 in the thickness direction are fixed to the outer walls 11. Further, the sealing members 31 may be provided either on an upper side or on a lower side to the sheet-like foamy thermoplastic resin material 6a or the foamed thermoplastic resin sheet 6, in a width direction.

In the vacuum chamber, the expanding zone 7 is a zone in which the sheet-like foamy thermoplastic resin material 6a extruded by the die 3 is to be further expanded with the temperature thereof adjusted suitable for foaming. The pressure in the expanding zone 7 is reduced. The expanding zone 7 is instantaneously widened to a width $W_2$ corresponding to the gap between the wall surfaces 12a and 13a, from a thickness corresponding to the aperture thickness of the die lip 3a, during manufacture of the foamed thermoplastic resin sheet 6.

Evacuation of the expanding zone 7 is carried out through a member having vacuum ports, which is provided on a part or a whole of walls surrounding the expanding zone 7.

The evacuation may be carried out by evacuating air in the thickness direction, or in the direction orthogonal to the thickness direction (in the width direction), or in both the directions. To evacuate in the thickness direction is preferable.

It is further preferable that the movable upper wall 12 have vacuum ports with a diameter of 20 mm or smaller each on end portions thereof in the width direction so that the pressure is reduced in the thickness direction. In the case where the diameter of the vacuum ports is more than 20 mm, melted resin tends to clog up, thereby sometimes causing the hauling operation of the foamed thermoplastic resin sheet 6 by the haul-off machine 5 to stop.

In the present embodiment, the movable upper and lower walls 12 and 13 are made of a material having the vacuum ports. As such a material, a porous material such as a sintered alloy or a porous electrocast shell is suitably adapted.

An example of the porous electrocast shell as one of the porous materials is PORASU DENCHU (POROUS ELECTROCAST, Japanese registered trademark), and FIGS. 3(a) and 3(b) schematically illustrate cross sections of the inner wall 14 made of POROUS ELECTROCAST. In POROUS ELECTROCAST, a vent hole H broadens toward a reverse side. Therefore, it has a property of being hardly clogged up, and has a low gas evacuation resistance. POROUS ELECTROCAST is an electrocast type which causes metal reversing by plating a model with a metal such as nickel.

The inner wall 14 shown in FIG. 3(b) has a thicker surface portion as compared with that of the inner wall 14 shown in FIG. 3(a). Therefore, the surface thereof is more easily processed, and a pressure resistance thereof increases. The number of ports of POROUS ELECTROCAST is usually 3/cm² to 7/cm², and preferably, 3/cm² to 5/cm². If the number is greater than the above, a strength gradually decreases.

It is required to form each vacuum port of the inner wall 14 not greater than 100 μm, preferably not greater than 50 μm, or more preferably not greater than 30 μm. In the case where the vacuum ports are great, additives, melted resin, and decomposited resin of the thermoplastic resin used tend to clog up the vacuum ports of the inner walls 14, and a large-scale vacuum pump 17 becomes needed to keep a desired reduced pressure.

Further, each inner wall 14 positioned in the expanding zone 7 is kept to a desired temperature by cooled water running through a cooled water path (temperature adjusting means, cooling medium path) 18 which is buried in the inner wall 14. In the case where the inner walls 14 are made of a metal with a high thermal conductivity, a great cooling effect can be achieved. The cooled water path 18 may be one line to cool the whole expanding zone 7. To keep good the foaming state of the sheet-like foamy thermoplastic resin material 6a, however, it is preferable that a plurality of independent lines are juxtaposed in the extrusion direction of the sheet-like foamy thermoplastic resin material 6a.

Incidentally, means for adjusting the temperature of the expanding zone 7 is not particularly limited, provided that it is capable of adjusting the temperature. For example, an arrangement in which air is blown into the expanding zone 7 is acceptable. In the case where this arrangement is adapted, it is possible to maintain the reduced pressure in the vacuum chamber 4 as a whole by carrying out vacuum drawing which overwhelms the air blowing.

Here, since the whole, or substantially whole, surfaces of the sheet-like foamy thermoplastic resin material 6a is brought into contact with the inner walls 14 in the expanding zone 7, the temperature of the inner walls 14 is fully conducted to the sheet-like foamy thermoplastic resin material 6a. As a result, a temperature adjustment effect is improved.

In the foregoing arrangement of the expanding zone 7, the sheet-like foamy thermoplastic resin material 6a is dragged while being in contact with the inner walls 14 in the expanding zone 7. Therefore, if a contact area thereof is large, the sheet 6a tends to be scarred on its surfaces, as well as smooth hauling of the sheet 6a cannot be achieved.

To solve these problems, a number of small protuberances 21 are formed on surfaces of the inner walls 14 in the expanding zone 7, that is, on the wall surfaces 12a and 13a in the expanding zone 7, as shown in FIGS. 3(a) and 3(b). The protuberances 21 shown in FIGS. 3(a) and 3(b) have curving surfaces and are independently formed. By making the wall surfaces 12a and 13a uneven with the protuberances 21, an area of the wall surfaces 12a and 13a in contact with the sheet-like foamy thermoplastic resin material 6a (for example, the sheet-like foamy polypropylene resin material) or the foamed thermoplastic resin sheet 6 is reduced, whereby smooth sliding of the sheet-like foamy thermoplastic resin material 6a or the foamed thermoplastic resin sheet 6 is achieved.

The area of the wall surfaces 12a and 13a in contact with the sheet-like foamy thermoplastic resin material 6a is preferably reduced to not less than 10 percent and not more than 80 percent the area in the case where the protuberances do not exist. In the case where the area of the wall surfaces 12a and 13a in contact with the sheet-like foamy thermoplastic resin material 6a is less than 10 percent, it is too small to ensure that the sheet-like foamy thermoplastic resin material 6a is sufficiently cooled. In the case where the contact area is greater than 80 percent, the hauling of the sheet-like foamy thermoplastic resin material 6a tends to become difficult.

Furthermore, it is more preferable that the protuberances 21 are plated with, for example, polytetrafluoroethylene (Teflon). This makes the sliding of the sheet-like foamy thermoplastic resin material 6a smoother, thereby decreasing probability that the surfaces thereof are scarred.

Patterns of the protuberances 21 shown in FIGS. 3(a) and 3(b) are merely examples, and there is no particular limitation on the pattern of the protuberances. The crepe pattern, or the crape pattern, for example, is suitably applied. The formation of protuberances in such a pattern and the plating of the same are more preferably carried out with respect to, not only the wall surfaces 12a and 13a of the expanding zone 7, but also wall surfaces of the outer walls 11 (see FIG. 2) enclosing the expanding zone 7. Alternatively, however, they may be carried out with respect to only a part of them. In the case where a porous material is used for drawing a vacuum, it is preferable that the formation of protuberances in a pattern and the plating of the same are carried out with respect to both the metal surfaces and surfaces of the porous material constituting inner wall surfaces of the expanding zone 7, but the formation of protuberances may be carried out with respect to only either the metal surfaces or the porous material.

FIGS. 3(a) and 3(b) show arrangements in which the protuberances 21 differing in size are provided, but the protuberances 21 formed to a uniform size may be provided, as shown in FIGS. 4(a) and 4(b). Regarding a shape of each protuberance 21, the protuberance 21 preferably has a curved surface (see FIGS. 3(a) and 4(a)). The shape is, however, not limited to this, and it may be a pyramid, or a cone (see FIG. 4(b)).

An apparent friction coefficient k between the sheet-like foamy thermoplastic resin material 6a and the wall surfaces 12a and 13a is preferably controlled so as to become not more than 0.4, by forming the protuberances in a desired pattern and plating them with, for example, polytetrafluoroethylene (Teflon). Here, the apparent friction coefficient k is defined by the following expression:

(DIFFERENTIAL PRESSURE)×(AREA OF WALL SURFACE 12a(OR 13a))×k=HAULING FORCE where the differential pressure is a differential pressure between pressure in the vacuum chamber 4 and the atmospheric pressure.

The apparent friction coefficient k is preferably not greater than 0.35, or more preferably not greater than 0.32. This is because that in the case where the apparent friction k is greater than 0.4, the hauling of the foamed thermoplastic resin sheet 6 by the haul-off machine 5 tends to stop.

On the other hand, the cooling zone 8 is a zone in which the foamed thermoplastic resin sheet 6 expanded in the thickness direction in the expanding zone 7 is cooled so as to be cured. The structure for drawing a vacuum in the cooling zone 8 is identical to that in the expanding zone 7, and air inside is evacuated through a member with vacuum ports. As the material with the vacuum ports, a porous material is desirable here as well, and conditions regarding an aperture of the vacuum ports, arrangement of the same, and suitable materials for forming the member, and the like, are the same as those described relating to the expanding zone 7. The number of the vacuum ports, however, may be smaller concerning the cooling zone 8 than that concerning the expanding zone 7. In the case where POROUS ELECTROCAST is used as a porous material, the number of pores of POROUS ELECTROCAST is not particularly limited, but it is preferably not more than $3/cm^2$.

The cooling zone 8 preferably has a lower pressure than the pressure in the expanding zone 7 (has a pressure close to the atmospheric pressure). In this case, an effect of facilitating the hauling of the foamed thermoplastic resin sheet 6 by the haul-off machine 5 can be achieved.

In the cooling zone 8 as well, the surfaces of the foamed thermoplastic resin sheet 6 are completely or partially brought into contact with the inner walls 14 in the cooling zone 8, thereby allowing the temperature of the inner walls 14 to be fully transmitted to the foamed thermoplastic resin sheet 6. As a result, a high cooling effect can be achieved.

Further, in the cooling zone 8 as well, like in the expanding zone 7, the foamed thermoplastic resin sheet 6 is dragged. Therefore, the surfaces of the inner wall surfaces of the cooling zone 8 are made uneven, with protuberances 21 being formed on the inner wall surfaces. More preferably, the protuberances are plated.

Incidentally, means for adjusting the temperature of the cooling zone 8 is not particularly limited, provided that it is capable of adjusting the temperature. An arrangement in which temperature adjustment is conducted with use of a cooling medium with a set desired temperature, an arrangement in which air is blown into the cooling zone 8, or the like is acceptable. In the case where the arrangement in which air is blown thereto is adapted, it is possible to maintain the reduced pressure in the vacuum chamber 4 as a whole, by carrying out vacuum drawing which overwhelms the air blowing. In the case where the foregoing arrangement is adapted, particularly, friction of the foamed thermoplastic resin sheet 6 with the inner wall surfaces is reduced, whereby the hauling of the foamed thermoplastic resin sheet 6 is further facilitated.

At the outlet of the cooling zone 8, it is preferable that the foamed thermoplastic resin sheet 6 has a central temperature of not higher than 50° C. which is a central temperature of the sheet-like foamy thermoplastic resin material 6a at the outlet of the die 3. By so doing, it is possible to maintain the cells grown in the thickness direction in the formed thermoplastic resin sheet 6 under a reduced pressure.

In the case where the foamed thermoplastic resin sheet manufacturing device arranged as described above is used, the foamed thermoplastic resin sheet 6 can be obtained through the following procedure.

First, the foaming agent and the thermoplastic resin are melted and kneaded by the extruder 1, and thereafter, the kneaded mixture is extruded by the die 3 into a sheet form, thereby being formed into the sheet-like foamy thermoplastic resin material 6a. Here, the manufacturing device is in a state in which, as shown in FIG. 5(a), the movable upper and lower walls 12 and 13 are positioned by the movable wall driving device (driving means) 23 at upper and lower positions, respectively, so that a gap between the wall surfaces 12a and 13a is wider than the thickness of the sheet-like foamy thermoplastic resin material 6a.

The sheet-like foamy thermoplastic resin material 6a extruded from the die 3 reaches the haul-off machine 5 through the vacuum chamber 4, becoming ready to be hauled by the haul-off machine 5. Here, the rolls 5a facing each other are in a state in which a gap therebetween is narrowed to the thickness of the sheet-like foamy thermoplastic resin material 6a.

Figures 5A, 5B:
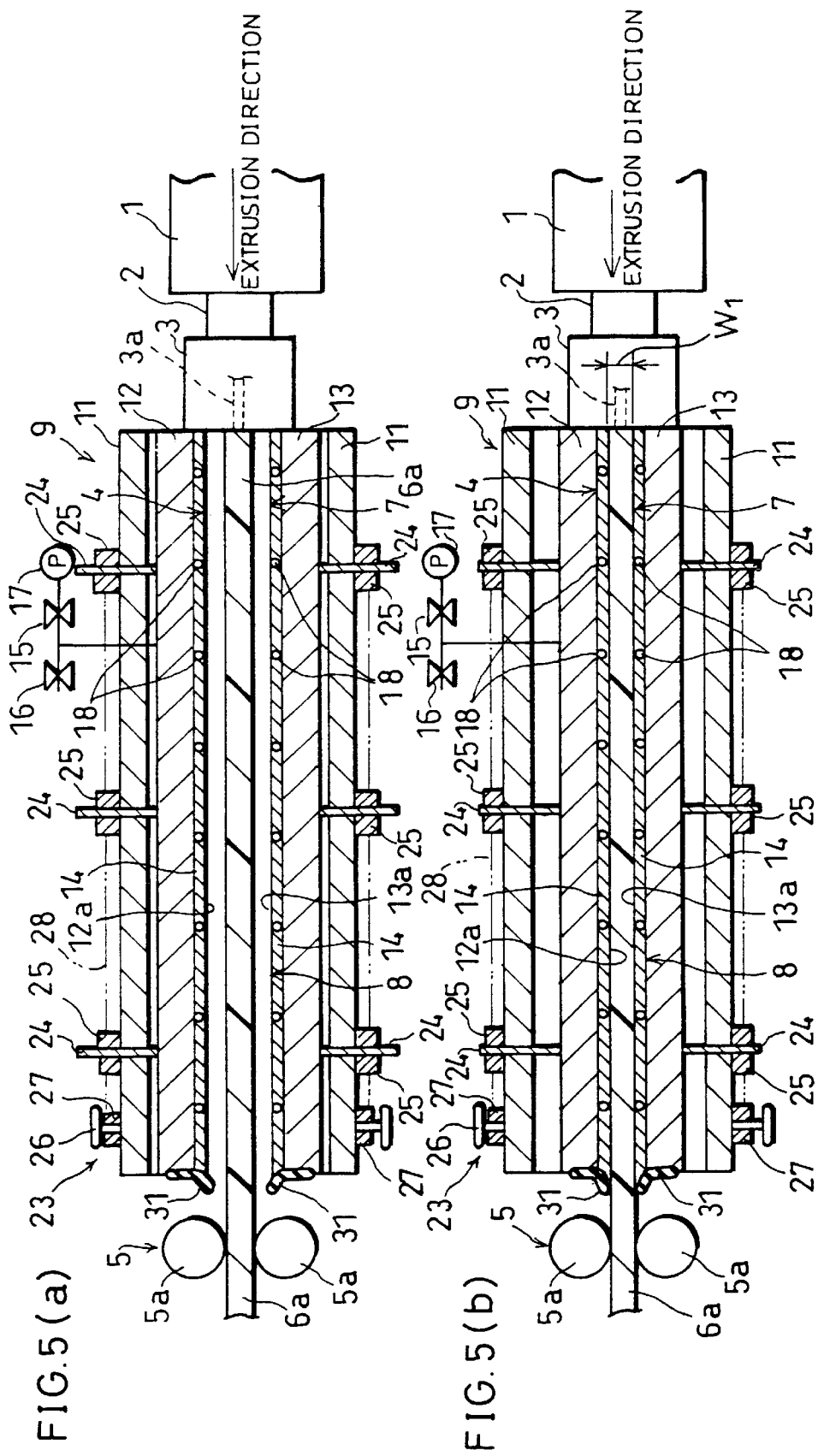
FIG. 5(a) is a schematic vertical cross-sectional view illustrating a state of the manufacturing device shown in FIG. 1(a) upon initialization of extrusion of a sheet-like foamy thermoplastic resin material.
FIG. 5(b) is a schematic vertical cross-sectional view illustrating a state subsequent to the state shown in FIG. 5(a), prior to pressure reduction of the vacuum chamber.

Subsequently, the sheet-like foamy thermoplastic resin material 6a is continuously extruded while the movable upper and lower walls 12 and 13 are moved so that the gap between the wall surfaces 12a and 13a is reduced to $W_1$ by the movable wall driving device 23, as shown in FIG. 5(b). The gap $W_1$ is equal to a thickness of the sheet-like foamy thermoplastic resin material 6a extruded from the die 3 when the vacuum chamber 4 is not subject to pressure reduction. In this state, ends of the sealing members 31 sufficiently reach the surfaces of the sheet-like foamy thermoplastic resin material 6a and covers the outlet of the vacuum chamber 4, thereby ensuring the state in which the vacuum chamber 4 is ready to be subject to pressure reduction. Here, the sealing members 31 are curved or bent in a direction of transport of the sheet-like foamy thermoplastic resin material 6a, in contact with the surfaces of the sheet-like foamy thermoplastic resin material 6a.

Thereafter, the pressure in the vacuum chamber 4 is reduced so as to become lower than the atmospheric pressure by not less than 100 mmHg, while the movable upper and lower walls 12 and 13 are moved until a gap between the wall surfaces 12a and 13a becomes equal to the width $W_2$, as shown in FIG. 1(a). The gap $W_2$ is set equal to the desired thickness of the foamed thermoplastic resin sheet 6 to be produced, and it can be arbitrarily changed. Incidentally, the pressure is preferably reduced by not more than 700 mmHg. Under the foregoing set conditions, the foamed thermoplastic resin sheet 6 can be smoothly hauled from the vacuum chamber 4.

With the foregoing pressure reducing operation, the sheet-like foamy thermoplastic resin material 6a further expands while going through the expanding zone 7, thereby becoming the foamed thermoplastic resin sheet 6. The foamed thermoplastic resin sheet 6 is cooled to be cured when the adjoining cooling zone 8, and subsequently hauled by the haul-off machine 5. Incidentally, in the case where the foamed thermoplastic resin sheet 6 is continuously produced, the vacuum chamber 4 is subject to pressure reduction, while the gap between the wall surfaces 12a and 13a is fixed to $W_2$.

As described above, since the present manufacturing device is arranged so that the gap $W_2$ between the wall surfaces 12a and 13a when the foamed thermoplastic resin sheet 6 is continuously manufactured is arbitrarily set by the movable wall driving device 23, it is possible to produce the foamed thermoplastic resin sheet 6 with a desired thickness. Therefore, the manufacturing device can be used for forming the foamed thermoplastic resin sheet 6 to various thicknesses. Thus, the manufacturing device has high flexibility.

Furthermore, by the movable wall driving device 23, the gap between the wall surface 12a of the movable upper wall 12 and the wall surface 13a of the movable lower wall 13 is narrowed in a period prior to pressure reduction in the vacuum chamber 4, i.e., when expansion of the sheet-like foamy thermoplastic resin material 6a due to pressure reduction does not yet start and the material 6a has a small thickness, whereas the gap is widened after the pressure reduction in the vacuum chamber 4 starts thereby causing the sheet-like foamy thermoplastic resin material 6a to expand due to the reduced pressure and have a greater thickness, that is, when the sheet-like foamy thermoplastic resin material 6a becomes the foamed thermoplastic resin sheet 6. Therefore, before and after the start of the pressure reduction in the vacuum chamber 4, the respective relationships between the wall surfaces 12a and 13a and the sheet-like foamy thermoplastic resin material 6a or the foamed thermoplastic resin sheet 6, that is, the respective position relationship between the sealing members 31 and the sheet-like foamy thermoplastic resin material 6a or the foamed thermoplastic resin sheet 6 in the thickness direction of the sheet-like material 6a (or sheet 6) can be maintained substantially unchanged. This allows the sealing members 31 to be made of a material with high flexibility, as well as to be formed to a simple structure. For example, it may be formed to a blade-like shape by using a material such as rubber.

In other words, in the present embodiment, there is no need to make the sealing members 31 of a material with a high rigidity or to provide sealing means of a complicated structure. Doing so is usually required for reducing that the pressure in the vacuum chamber 4 in the case where wide gaps exist between the sheet-like foamy thermoplastic resin material 6a and the wall surfaces 12a and 13a respectively before the pressure reduction in the vacuum chamber 4, as is the case with an arrangement in which the wall surfaces 12*a* and 13*a* are unmovable.

With the foregoing arrangement of the present embodiment, such a sealing state of the vacuum chamber 4 that the pressure reduction is enabled is maintained by the sealing members 31, while the sealing members 31 are prevented from, with a pressing force thereof, scarring the surfaces of the foamed thermoplastic resin sheet 6, or crushing cells in the foamed thermoplastic resin sheet 6. As a result, the foamed thermoplastic resin sheet 6 is formed without difficulty to have a good surface condition and to fully enjoy an effect of cell growth due to pressure reduction thereby having the cells therein efficiently grown up in the thickness direction.

Figure 6:
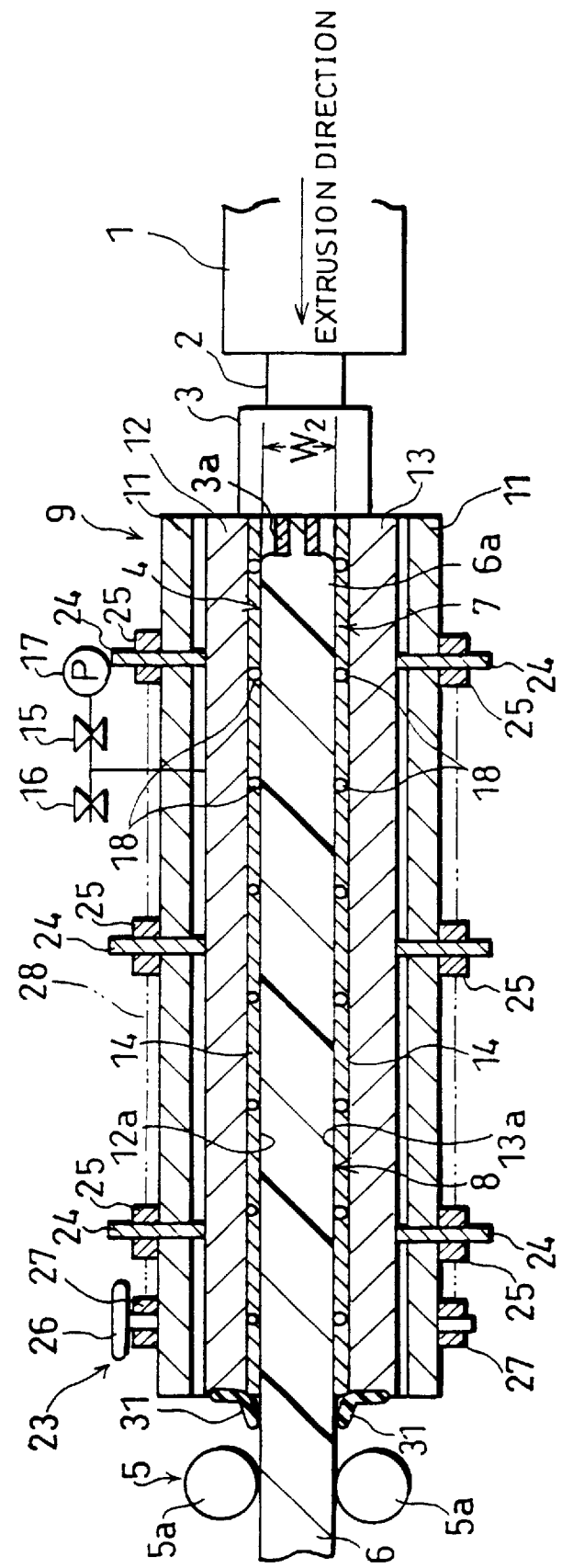
FIG. 6 is a schematic vertical cross-sectional view illustrating another example of the manufacturing device shown in FIG. 1(a), in which a die lip projects into the vacuum chamber.

Incidentally, the manufacturing device of the present embodiment may be arranged so that the die lip 3*a* of the die 3 projects to an inlet part of the vacuum chamber 4, as shown in FIG. 6. This arrangement ensures prevention of such a problem that, in a state as shown in FIG. 5(*b*) in which the gap between the wall surfaces 12*a* and 13*a* is narrowed, a part of the sheet-like foamy thermoplastic resin material 6*a* gets into a crack between the movable upper or lower wall 12 or 13 and the die 3, thereby hindering transport of the sheet-like foamy thermoplastic resin material 6*a*.

Incidentally, a thermoplastic resin which can be used as a material of the foamed thermoplastic resin sheet 6 is not particularly limited, and any resin which is usually used as extrusion molding compound or injection molding compound is adaptable. Examples of such resins include polyolefin resin such as polyethylene and polypropylene, polystyrene, polyvinyl chloride, polyamide, acrylic resin, polyester, polycarbonate, and a copolymer of any ones of these resins. It is preferable that polypropylene resin is used as the thermoplastic resin. The polypropylene resin may be any one among a homopolymer, a block polymer, and a random polymer. Further, it may be a mixture of the same with another olefin resin. In this case, the polyolefin to be mixed is preferably a polyolefin with the number of carbon atoms of not more than 10, such as polyethylene or polybutene, and polyethylene resin is most preferable among them. In the case where the polypropylene resin and another polyolefin resin are mixed, a content of the polypropylene is set to 50 wt %.

An example of more preferable polypropylene resin is a propylene polymer whose melt strength is improved. Such a propylene polymer can be obtained by a method of polymerizing components differing in molar weight at multiple stages, a method of using a specific catalyst, a method of applying a post-processing operation such as crosslinking to a propylene polymer, or the like. Among these methods, the method of polymerizing components differing in molar weight at multiple stages is preferable from a viewpoint of productivity.

The foregoing resins may contain any generally-used additive, including a filler such as talc, a pigment, an antistatic agent, an antioxidant, and the like. No specific limitation is on the foaming agent applied to the present invention, and any foaming agent, a physical foaming agent or a chemical foaming agent, can be used.

[Second Embodiment]

Figure 7:
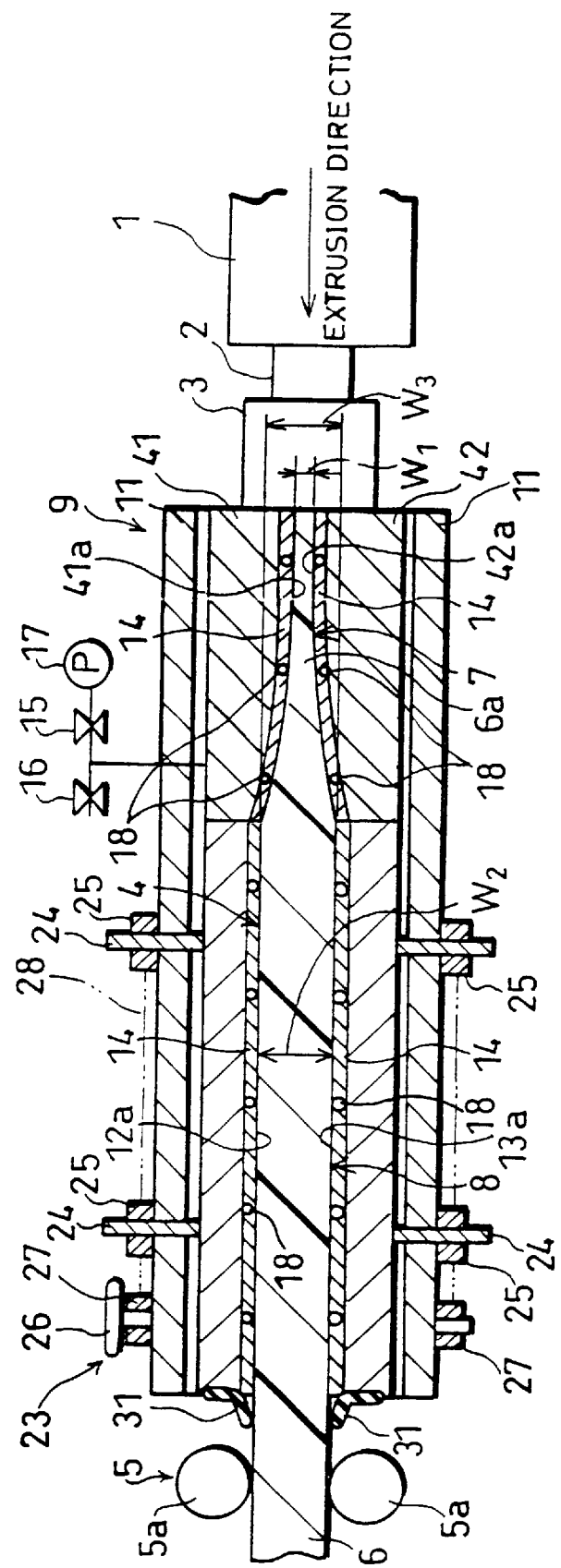
FIG. 7 is a schematic cross-sectional view illustrating an arrangement of a foamed thermoplastic resin sheet manufacturing device in accordance with another embodiment of the present invention.
Figures 8A, 8B:
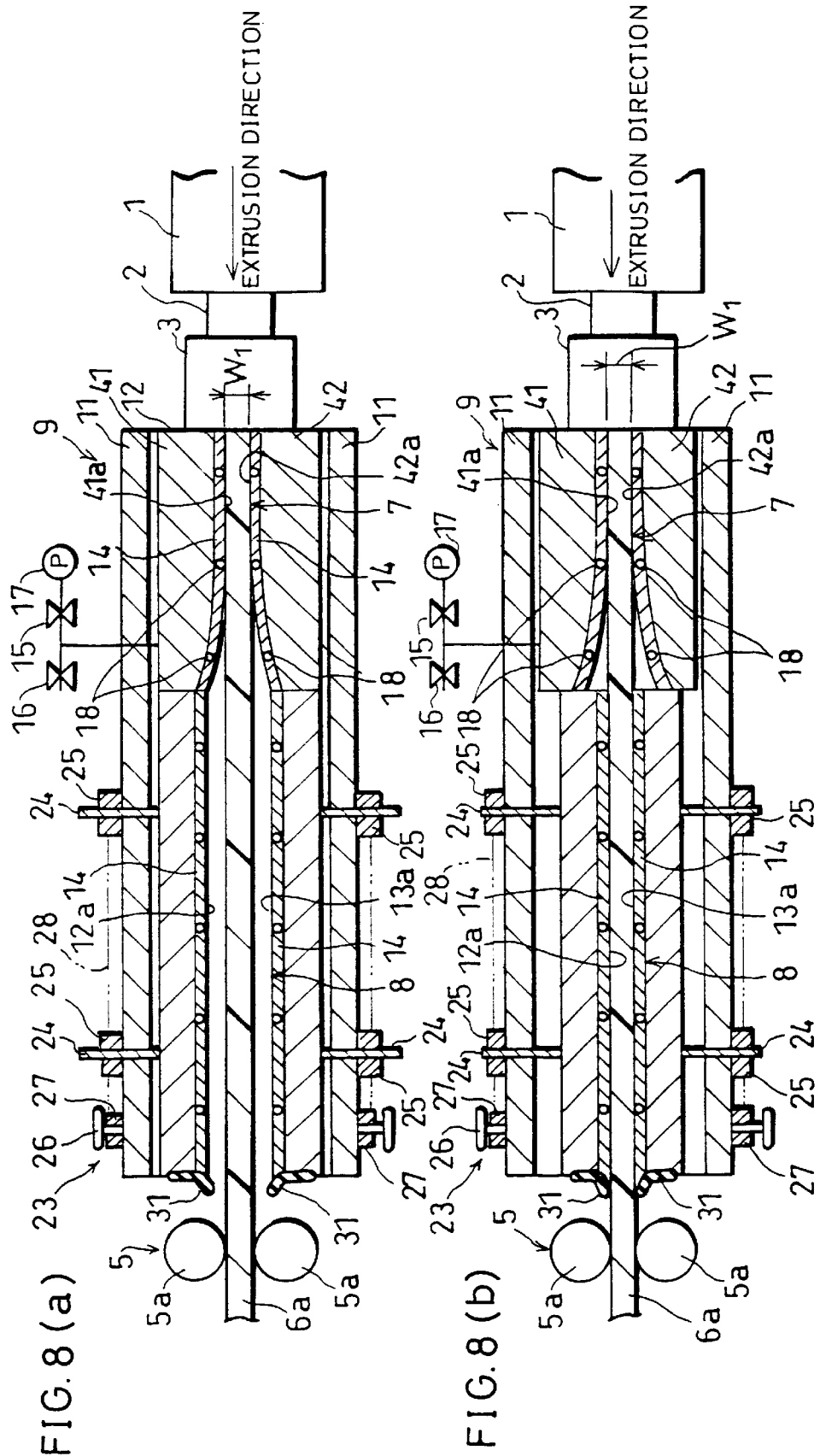
FIG. 8(a) is a schematic vertical cross-sectional view illustrating a state of the manufacturing device shown in FIG. 7 upon initialization of extrusion of a sheet-like foamy thermoplastic resin material.
FIG. 8(b) is a schematic vertical cross-sectional view illustrating a state which is subsequent to the state shown in FIG. 8(a) and prior to pressure reduction of the vacuum chamber.

The following description will explain another embodiment of the present invention while referring to FIGS. 7 and 8. The members having the same structure (function) as those in the above-mentioned embodiment will be designated by the same reference numerals and their description will be omitted.

A foamed thermoplastic resin sheet manufacturing device of the present embodiment is arranged so that an upper wall and a lower wall forming the vacuum chamber 4 of the molding section 9 are composed of a fixed upper wall 41 and a fixed lower wall 42 in a front part and the movable upper wall 12 and the movable lower wall 13 in a rear part. A space between a wall surface 41*a* of the fixed upper wall 41 and a wall surface 42*a* of the fixed lower wall 42 which face each other constitutes the expanding zone 7. The wall surfaces 41*a* and 42*a* gradually curve or slant so that a gap therebetween is widened from an inlet to an outlet of the expanding zone 7. A gap between the wall surfaces 41*a* and 42*a* is set to $W_1$ at the inlet, while it is set to $W_3$ at the outlet. The gap $W_3$ is set, for example, equal to a thickness of a foamed thermoplastic resin sheet 6 which is thinnest among frequently-produced foamed thermoplastic resin sheets 6 differing in thickness. Therefore, in this case, when the foamed thermoplastic resin sheet 6 which is thinnest is produced, the gap $W_3$ becomes equal to the gap $W_2$. Note that, as described above, the gap $W_2$ is equivalent to a desired thickness of the foamed thermoplastic resin sheet 6 to be formed.

Placed under a reduced pressure in the expanding zone 7, the sheet-like foamy thermoplastic resin material 6*a* extruded from the die 3 expands gradually in the thickness direction to a shape determined by the wall surfaces 41*a* and 42*a*. Then, it has a thickness equal to the gap $W_3$ at the end of the expanding zone 7, and has a thickness equal to the gap $W_2$ at the inlet of the cooling zone 8.

A space between the wall surfaces 12*a* and 13*a* of the movable upper and lower walls 12 and 13 which face each other constitutes the cooling zone 8. The wall surfaces 12*a* and 13*a* are plane and are movably provided so as to approach/separate to/from each other, driven by the movable wall driving device 23, as described above.

The movement of the movable upper and lower walls 12 and 13, the movement of the sealing members 31, the pressure reducing operation, and the like during manufacture of the foamed thermoplastic resin sheet 6 are identical to those in the first embodiment, and the state shown in FIG. 7 corresponds to the state shown in FIG. 1(*a*), while the states shown in FIGS. 8(*a*) and 8(*b*) correspond to the states shown in FIGS. 5(*a*) and 5(*b*), respectively.

With the present manufacturing device in which the gap between the wall surfaces 41*a* and 42*a* is gradually widened, the sheet-like foamy thermoplastic res in material 6*a* extruded from the die 3 is smoothly guided, and hauled by the haul-off machine 5 in a good condition. Furthermore, effects achieved by that the wall surfaces 12*a* and 13*a* are movable and that the sealing members 31 are provided are identical to those described above.

[Third Embodiment]

Figure 9:
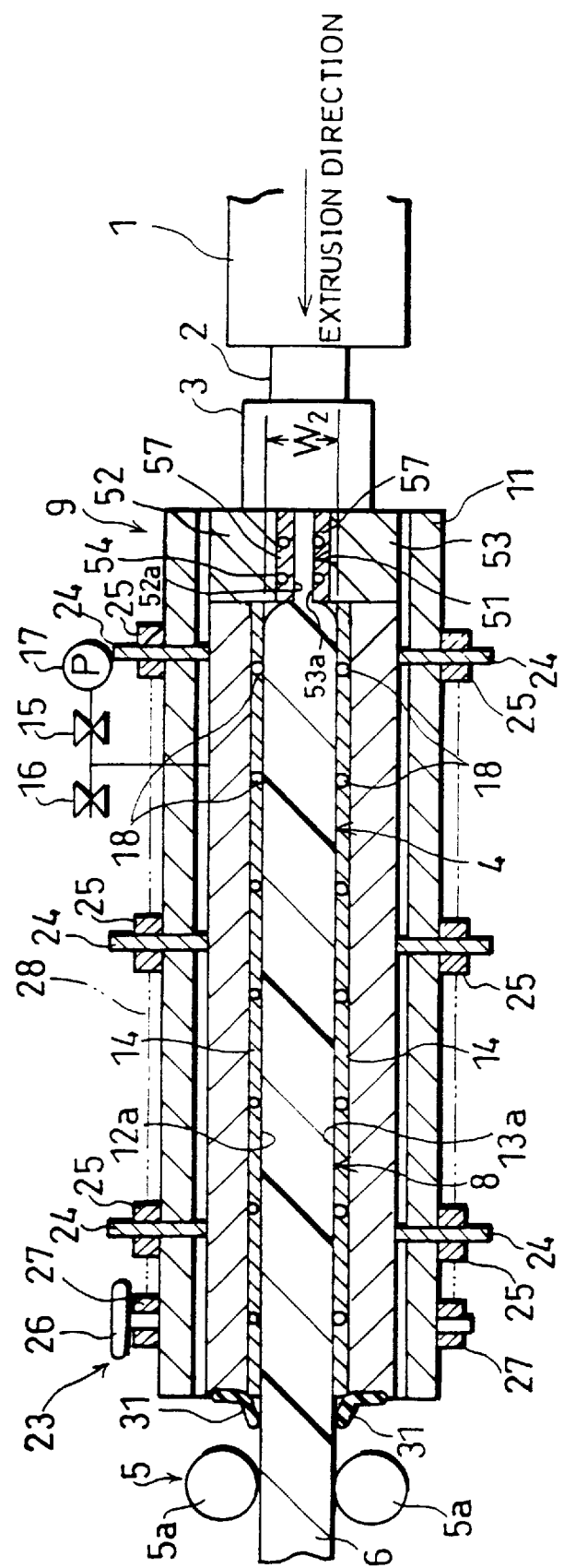
FIG. 9 is a schematic vertical cross-sectional view illustrating an arrangement of a foamed thermoplastic resin sheet manufacturing device in accordance with still another embodiment of the present invention.

The following description will explain still another embodiment of the present invention while referring to FIGS. 9 and 10. The members having the same structure (function) as those in the above-mentioned embodiments will be designated by the same reference numerals and their description will be omitted.

The manufacturing device shown in FIG. 9 is equipped with a temperature adjusting zone 51 in the molding section 9, before the vacuum chamber 4. A fixed upper wall 52 and a fixed lower wall 53, a space between which constitutes the temperature adjusting zone 51, have inner walls 57, respectively, which are made of a metal with a high thermal conductivity. Inside or outside the inner walls 57, there are provided temperature adjusting medium paths 54 through which a temperature adjusting medium flows.

The temperature adjusting zone 51 is a zone for adjusting a surface temperature of the sheet-like foamy thermoplastic resin material 6a extruded from the die 3 to a temperature in a desired temperature range. To be more specific, the sheet-like foamy thermoplastic resin material 6a is heated to a predetermined temperature by heat supplied from the temperature adjusting medium paths 54. The provision of the temperature adjusting zone 51 enables adjustment of a temperature in the expanding zone 7 during the expansion, thereby ensuing more stable production of the foamed thermoplastic resin sheet 6.

The set temperature is determined depending on a thermoplastic resin and a foaming agent used, and in the case where the thermoplastic resin is a crystalline resin, the temperature is set not lower than the crystallization point, and not higher than a temperature of the sheet-like foamy thermoplastic resin material 6a at the outlet of the die 3.

For example, in the case where a polypropylene resin is used as a thermoplastic resin, the temperature of the temperature adjustment zone 51 is set to 130° C. to 180° C., and the surface temperature of the sheet-like foamy thermoplastic resin material 6a is controlled so as to fall in a range of ±2° C. to the foregoing set temperature.

Particularly in the case where the die 3 is a circular die and a sheet-like foamy thermoplastic resin material which is obtained by cutting in a lengthwise direction a cylindrical-form foamy thermoplastic resin material extruded from the die 3 is expanded under a reduced pressure, the manufacturing device of a foamed thermoplastic resin sheet preferably has the temperature adjusting zone 51.

Incidentally, the means for heating the inner walls 57 is not limited to the temperature adjusting medium paths 54, and there is no specific limitation on the means, provided that it is capable of adjusting temperature and keeping the temperature of the inner walls 57 to the set temperature.

Furthermore, since the temperature of the surfaces of the sheet-like foamy thermoplastic resin material 6a can be more easily controlled in the case where the whole surfaces of the sheet-like foamy thermoplastic resin material 6a are in contact with the inner walls 57, it is preferable that the gap between the wall surfaces 52a and 53a of the inner walls 57 in the temperature adjusting zone 51 is substantially equal to $W_1$, i.e., substantially equal to a thickness of the sheet-like foamy thermoplastic resin material 6a extruded from the die 3, and if possible, it is more preferable that the gap between the wall surface 52a and 53a is adjustable. It is, however, not indispensable to make the whole surfaces of the sheet-like foamy thermoplastic resin material 6a be in contact with the inner surfaces of the temperature adjusting zone 51.

Furthermore, the manufacturing device may be arranged, as shown in FIGS. 10(a) and 10(b), so that the molding section 9 including the temperature adjusting zone 51 may be distanced from the die 3. Here, at least a pair of rolls 55 is preferably provided at an inlet of the temperature adjusting zone 51 so that the sheet-like foamy thermoplastic resin material 6a extruded from the die 3 is taken into the temperature adjusting zone 51 through between the rolls 55. In this manufacturing device, a pair of cutters 56 may be provided at the inlet of the temperature adjusting zone 51, on both sides thereof in the sheet width direction as shown in FIG. 10(b), so as to adjust the width of the sheet-like foamy thermoplastic resin material 6a.

With the arrangement in which the rolls 55 are provided, it is possible to adjust the thickness of the sheet-like foamy thermoplastic resin material 6a before the sheet-like foamy thermoplastic resin material 6a enters the vacuum chamber 4, thereby facilitating the sliding of the sheet-like foamy thermoplastic resin material 6a into the temperature adjusting zone 51.

The rolls 55 are preferably arranged so that a temperature thereof can be controlled, and the temperature is appropriately set depending on a thermoplastic resin and a foaming agent used, as well as a thickness of the foamed thermoplastic resin sheet 6 to be formed. The temperature is, however, preferably set not higher than the temperature of the sheet-like foamy thermoplastic resin material 6a at the outlet of the die 3, and not lower than the set temperature of the temperature adjusting zone 51.

Incidentally, the cutters 56 are not necessarily provided, but provision of the same is preferable for the following reasons. By cutting, with the cutters 56, the sheet-like foamy thermoplastic resin material 6a so as to have a width in accordance with a transport path width in the temperature adjusting zone 51, sliding of the sheet-like foamy thermoplastic resin material 6a into the temperature adjusting zone 51 is facilitated.

[Fourth Embodiment]

The following description will explain still another embodiment of the present invention while referring to FIG. 11. The members having the same structure (function) as those in the above-mentioned embodiments will be designated by the same reference numerals and their description will be omitted.

Figures 11A, 11B:
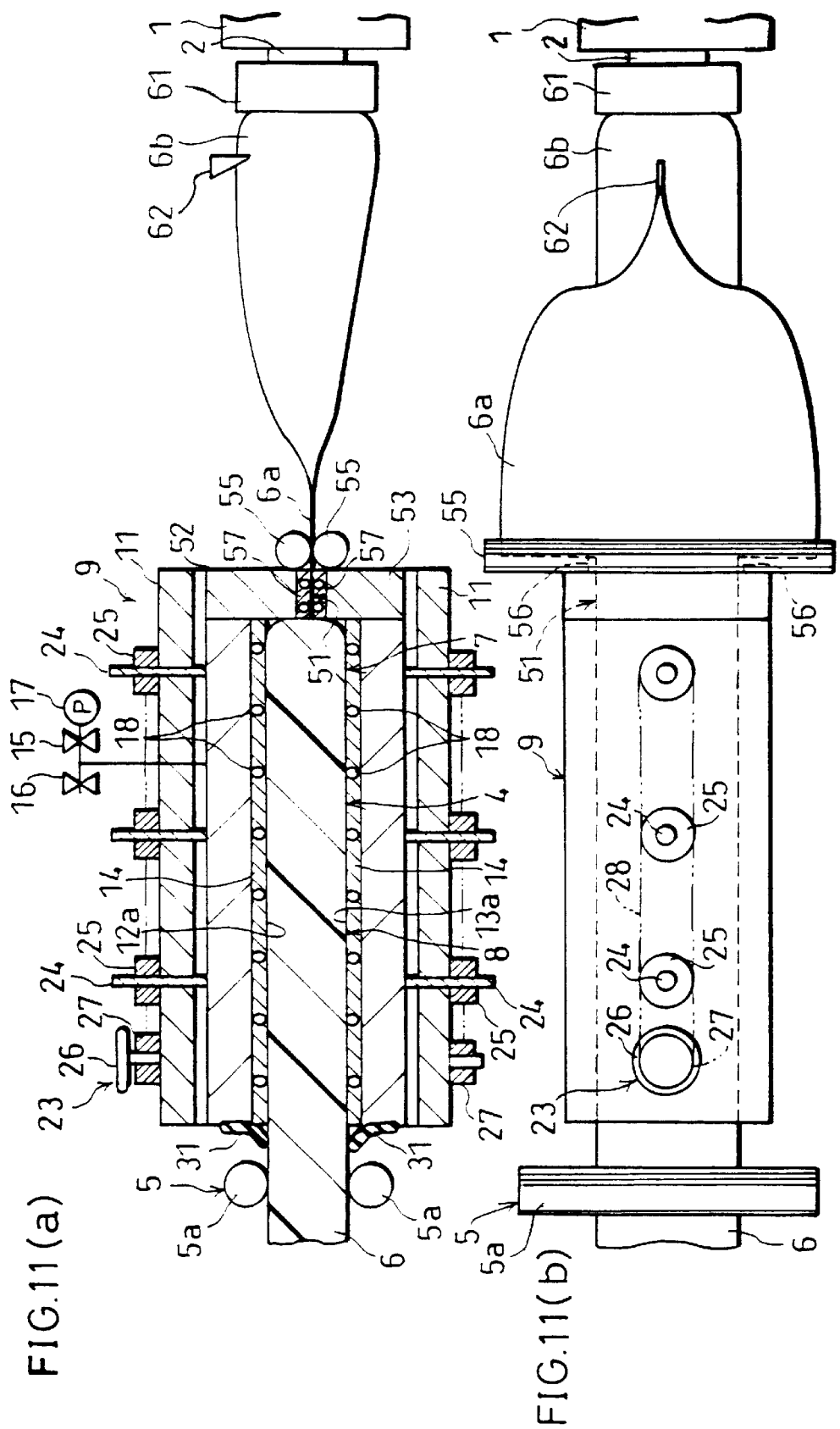
FIG. 11(a) is a schematic vertical cross-sectional view illustrating an arrangement of a foamed thermoplastic resin sheet manufacturing device in accordance with still another embodiment of the present invention.
FIG. 11(b) is a plan view of the same.

The device for manufacturing the foamed thermoplastic resin sheet 6 may be arranged as shown in FIGS. 11(a) and 11(b). This manufacturing device is equipped with a circular die 61, in the place of the die 3 which forms into a sheet form the foamy thermoplastic resin material extruded from the extruder 1 through the head part 2. The circular die 61 is intended to process the foamy thermoplastic resin material extruded from the extruder 1 through the head part 2 into a cylindrical foamy thermoplastic resin material 6b.

Behind the circular die 61, there is provided a cutter 62 which cuts in the extrusion direction the cylindrical foamed thermoplastic resin material 6b extruded into the atmosphere through the circular die 61, thereby forming it into a developed sheet-like foamy thermoplastic resin material 6a. Therefore, the cylindrical foamy thermoplastic resin material 6b is cut out by the cutter 62 thereby becoming the sheet-like foamy thermoplastic resin material 6a. Then, it is taken into the vacuum chamber 4 by the rolls 55.

Incidentally, the means for cutting out the cylindrical foamy thermoplastic resin material 6b is not limited to the cutter 56, but any means may be applicable provided that it is capable of the foregoing cutting operation.

Furthermore, the aforementioned manufacturing device is provided with the temperature adjusting zone 51 before the vacuum chamber 4. The function of the temperature adjusting zone 51 is described as above. Further, the foregoing roll 55 and the cutter 56 are not indispensable, though they are provided at the entrance of the temperature adjusting zone 51 so that the arrangement becomes desirable for taking the sheet-like foamy thermoplastic resin material 6a into the vacuum chamber 4.

In the manufacturing device as described above, the extruder 1, the die 3, and the vacuum chamber 4 are provided in a row in a horizontal direction, but alternatively, they may be disposed so that the extrusion direction of the die 3 is a downward direction and that the vacuum chamber 4 is disposed on a product in such an extrusion direction.

Here, the following description will explain a result of observation of cell forms of foamed thermoplastic resin sheets 6 produced by the foregoing manufacturing devices. As a result of the observation, it was found that each obtained foamed thermoplastic resin sheet had a foaming ratio of 2.5 or more, and cells existing in an interior part which extended inward from a depth of 20 percent the whole thickness of the foamed thermoplastic resin sheet from both the surfaces of the sheet respectively in the thickness direction of the same, and from a depth of 15 percent the width of the foamed thermoplastic resin sheet from both the side surfaces respectively, satisfied the following expressions (1) and (2):

$$0.5 \leq D/C \leq 0.9 \tag{1}$$

$$0.5 \leq E/C \leq 0.9 \tag{2}$$

where C represents a mean cell diameter in the thickness direction of the foamed thermoplastic resin sheet, D represents a mean cell diameter in the extrusion direction of the same, and E represents a mean cell diameter in the width direction of the same.

EXAMPLE 1

The following description will explain an example of the present invention while referring to FIG. 12.

In the present example, a mixture of polypropylene and polyethylene was used as the thermoplastic resin, and a mixture ratio thereof, i.e., polypropylene: polyethylene, was set to 70 wt %:30 wt %. Further, as a foaming agent and a foaming assistant, 3.5 parts by weight of a 30 wt % masterbatch (base: polyethylene) of a composite foaming agent in which sodium bicarbonate/azodicarbonamide/zinc oxide was 9/0.5/0.5 was added.

The manufacturing device shown in FIG. 1 was used to produce the foamed thermoplastic resin sheet 6 herein. In the manufacturing device, a single-axis 65 mmφ extruder was used as the extruder 1. Set conditions of the device are shown in Table 1 below.

TABLE 1

| | |
|---|---|
| DIE TEMPERATURE | 175° C. |
| EXPANDING ZONE TEMPERATURE | 60° C. |
| COOLING ZONE TEMPERATURE | 30° C. |
| VACUUM CHAMBER PRESSURE (DIFFERENTIAL PRESSURE) | 360 mmHg |
| APPARENT FRICTION COEFFICIENT | 0.32 |

A cross section of the foamed thermoplastic resin sheet 6 produced by using the foregoing manufacturing device was observed and cell diameters were measured. It was confirmed that the measurement result satisfied the aforementioned requirements (the formulas (1) and (2)). The measurement result is shown in Table 2. For a control, a resin with the same composition and the same foaming agent, extruder 1, and die 3 as those in the example were used, and a foamed thermoplastic resin sheet was produced by extrusion to an atmospheric pressure. A result of observation of a cross section of the obtained foamed thermoplastic resin sheet is shown in the table.

Incidentally, as measured values of each cell, maximum tangent line distances of the cell in the thickness direction, the extrusion direction, and the width direction of the foamed thermoplastic resin sheet were used, as shown in FIG. 12.

Furthermore, (mean cell diameter in the extrusion direction of the foamed thermoplastic resin sheet)/(mean cell diameter in the thickness direction of the foamed thermoplastic resin sheet), that is, D/C, was measured by the following method.

First, an area of 20 cm (in the width direction)×20 cm (in the extrusion direction) was chosen out of the whole area of the sheet excluding 15 percent the width of the sheet from both side edges of the sheet, respectively, and at three points in the chosen area, samples having cross sections parallel with the extrusion direction and the thickness direction and samples having cross sections parallel with the width direction and the thickness direction were taken out. Then, regarding each sample, a photomicrograph of a cross section parallel with the extrusion direction in a region whose depth from each surface of the sheet exceeds 20 percent the whole thickness of the foamed thermoplastic resin sheet was taken. Regarding more than half of cells in a 1 mm² square region in each photomicrograph, c (diameter in the thickness direction) and d (diameter in the extrusion direction) were measured in the manner shown in FIG. 12. Then, from $c_1, c_2, \ldots c_n$ and $d_1, d_2, \ldots d_n$ in all the regions thus obtained, C and D which are mean values of c and d, respectively, were found, and further, D/C was obtained. Here, n satisfies n≧30.

Furthermore, (mean cell diameter in the width direction of the foamed thermoplastic resin sheet)/(mean cell diameter in the thickness direction of the foamed thermoplastic resin sheet), i.e., E/C was measured by the following method.

Regarding each of the foregoing three samples, a photomicrograph of a cross section parallel with the width direction in a region whose depth from each surface of the sheet exceeds 20 percent the whole thickness of the foamed thermoplastic resin sheet was taken. Regarding more than half of cells in a 1 mm² square region in each photomicrograph, c (diameter in the thickness direction) and e (diameter in the width direction) were measured in the manner shown in FIG. 12. Then, from $c_1, c_2, \ldots c_n$ and $e_1, e_2, \ldots e_n$ in all the regions thus obtained, C and E which are mean values of c and e, respectively, were found, and further E/C was obtained. Here, n satisfies n≧30.

Smoothness of surfaces of the foamed thermoplastic resin sheet 6 was evaluated by *center line average height Ra indicating surface roughness specified by JIS B0601. The center line average height Ra was measured under conditions of a cut-off value of 0.8 mm, a measured length of 10 mm, and a driving speed of 0.3 mm/S, and the measured result is an average of measured values at 5 points.

TABLE 2

| | THICKNESS (mm) | MAGNIFICATION (DIAMETER) | CELL FORM D/C | CELL FORM E/C | SURFACE ROUGHNESS |
|---|---|---|---|---|---|
| EXAMPLE | 6.8 | 5.4 | 0.7 | 0.8 | ○ |
| CONTROL | 2.8 | 2.7 | 1.4 | 1.3 | Δ |

Center line average height Ra (mm) ○: Ra ≦ 0.4
Δ: 0.4 < Ra ≦ 0.8
x: 0.8 < Ra
C: mean cell diameter in the thickness direction
D: mean cell diameter in the extrusion direction
E: mean cell diameter in the width direction It was confirmed that the foamed thermoplastic resin sheet 6 of the example having the cell form as described above had a high foaming ratio and a great thickness.

The foamed thermoplastic resin sheet manufacturing device of the present invention may be arranged so as to further comprise driving means for moving the movable wall in the directions, wherein (i) the die has an outlet part which is long in the width direction of the foamy thermoplastic resin material, (ii) each of the walls in pair in the facing-wall section is the movable wall, and (iii) the driving means moves the movable walls to positions which are at equal distances respectively from a reference position which is a central position of the foamy thermoplastic resin material at the outlet part in the thickness direction of the resin material.

With the foregoing arrangement, driven by the driving means, the movable walls move to positions which are at equal distances respectively from a reference position which is a central position, in the resin material thickness direction, of the foamy thermoplastic resin material at the outlet part of the die.

Therefore, respective position relations between the outlet part of the die and the walls in pair of the facing-wall section coincide with each other, thereby ensuring that the formation of the foamed thermoplastic resin sheet between the walls in the vacuum chamber is smoothly carried out. Besides, on both sides to the foamed thermoplastic resin sheet, the reduced pressure in the vacuum chamber is stably maintained.

Furthermore, the foamed thermoplastic resin sheet manufacturing device of the present invention may be further arranged so as to comprise temperature adjusting means for adjusting a temperature of the foamy thermoplastic resin material in the vacuum chamber.

With the foregoing arrangement, immediately after the expansion of the foamy thermoplastic resin material under a reduced pressure in the vacuum chamber, a temperature of the foamed thermoplastic resin sheet obtained is adjusted to a desired temperature by the temperature adjusting means. As a result, the foamed thermoplastic resin sheet can be kept in the highly foaming state under the reduced pressure.

Furthermore, the foamed thermoplastic resin sheet manufacturing device of the present invention may be further arranged so that (i) the temperature adjusting means includes a cooling medium path provided in inner walls of the vacuum chamber, and (ii) at least a part of the foamy thermoplastic resin material is in contact with the inner walls of the vacuum chamber.

With the foregoing arrangement, the highly foaming state of the foamed thermoplastic resin sheet can be more surely maintained.

Furthermore, the foamed thermoplastic resin sheet manufacturing device of the present invention may be further arranged so that the vacuum chamber includes an expanding zone for expanding the foamy thermoplastic resin material and a cooling zone for cooling the foamed thermoplastic resin sheet obtained by expansion of the foamy thermoplastic resin material under a reduced pressure.

According the foregoing arrangement, the foamy thermoplastic resin material expands in the expanding zone thereby becoming the foamed thermoplastic resin sheet, and thereafter the sheet is cooled in the cooling zone. As a result, the foamed thermoplastic resin sheet is kept in the highly foaming state under the reduced pressure.

Furthermore, the foamed thermoplastic resin sheet manufacturing device of the present invention may be further arranged so as to comprise temperature adjusting means for adjusting a temperature of the foamy thermoplastic resin material in the expanding zone.

With the foregoing arrangement, immediately after the expansion of the foamy thermoplastic resin material under a reduced pressure in the expanding zone, a temperature of the foamed thermoplastic resin sheet obtained is adjusted to a desired temperature by the temperature adjusting means. As a result, the foamed thermoplastic resin sheet can be kept in the highly foaming state under the reduced pressure.

Furthermore, the foamed thermoplastic resin sheet manufacturing device of the present invention may be arranged so that (i) the temperature adjusting means includes a cooling medium path provided in inner walls of the vacuum chamber in the expanding zone, and (ii) at least a part of the foamy thermoplastic resin material is in contact with the inner walls of the vacuum chamber in the expanding zone.

With the foregoing arrangement, the highly foaming state of the foamed thermoplastic resin sheet can be more surely maintained.

Furthermore, the foamed thermoplastic resin sheet manufacturing device of the present invention may be arranged so as to comprise a cooling medium path provided in inner walls of the vacuum chamber in the cooling zone, wherein at least a part of the foamed thermoplastic resin sheet is in contact with the inner walls of the vacuum chamber in the cooling zone.

With the foregoing arrangement, the cooling zone for cooling the foamed thermoplastic resin sheet can be easily realized, while the foamed thermoplastic resin sheet can be efficiently cooled. Incidentally, the foamed thermoplastic resin sheet may be partially brought into contact with the inner walls of the vacuum chamber, but it is preferable that the whole surfaces of the foamed thermoplastic resin sheet are brought into contact therewith.

Furthermore, the foamed thermoplastic resin sheet manufacturing device of the present invention may be arranged so that the die has an outlet part which is long in the width direction of the foamy thermoplastic resin material and projects to inside of the vacuum chamber.

Usually, a part of the foamy thermoplastic resin material extruded from the outlet part of the die tends to get into a crack between the movable wall and the die in a state in which the gap between the walls in pair of the facing-wall section which face each other is narrowed, thereby hindering transport of the foamy thermoplastic resin material. However, this can be avoided by the foregoing arrangement wherein the outlet part of the die projects into the vacuum chamber.

Thus, as described above, in the foamed thermoplastic resin sheet manufacturing device of the present invention, the vacuum chamber is arranged so that temperature is more easily adjusted as compared with the vacuum chamber of the conventional device. Therefore, a foamed thermoplastic resin sheet with its foaming state under a reduced pressure well maintained can be obtained. As a result, a foamed thermoplastic resin sheet which fully enjoys an effect of cell growth due to pressure reduction thereby having the cells therein grown up in the thickness direction of the sheet, and has a good appearance.

Furthermore, the foamed thermoplastic resin sheet manufacturing device of the present invention may be arranged so that at least a part of walls enclosing the vacuum chamber is made of a material having a plurality of vacuum ports, and evacuation of the vacuum chamber is carried out through the material having vacuum ports.

According to the foregoing arrangement, at least a part of walls enclosing the vacuum chamber is made of a material having a plurality of vacuum ports, and evacuation of the vacuum chamber is carried out through the material. Therefore, even if, for example, a part of the vacuum ports is clogged up with the foamy thermoplastic resin material, evacuation of the vacuum chamber is ensured. Incidentally, examples of the materials having a plurality of vacuum ports include a member on which a number of fine slits with a very small width each are formed.

Furthermore, the foamed thermoplastic resin sheet manufacturing device of the present invention may be arranged so that the material having vacuum ports is a porous material.

With the foregoing arrangement, the aforementioned accident that the foamy thermoplastic resin material clogs up a part of the vacuum ports thereby hindering the evacuation of the vacuum chamber, for example, can be more surely avoided.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A manufacturing device of a foamed thermoplastic resin sheet, comprising:
    an extruder for melting and kneading a thermoplastic resin and a foaming agent to form a melted/kneaded mixture, and extruding the melted/kneaded mixture;
    a die provided at a front end of said extruder, for forming the melted/kneaded mixture into a sheet form foamy thermoplastic resin material;
    a vacuum chamber in which the foamy thermoplastic resin material extruded through said die expands under a reduced pressure;
    a facing-wall section composed of a pair of walls of said vacuum chamber which face each other in a thickness direction of the foamy thermoplastic resin material, at least one of the walls being a movable wall that is movable in directions in which said walls approach and separate each other, and is movable while staying in a parallel state with the other wall of said pair of walls, and wherein at least one of said pair of walls has vacuum ports with a diameter of 20 mm or smaller;
    a sealing member provided at least on said movable wall in said facing-wall section, at an outlet of said vacuum chamber, so as to seal a space between said wall and a foamed thermoplastic resin sheet coming out of said vacuum chamber, the foamed thermoplastic resin sheet being obtained as a result of expansion of the foamy thermoplastic resin material under a reduced pressure; and
    driving means for driving said movable wall so as to control a space in said facing-wall section, depending on a thickness of the sheet form foamy thermoplastic resin material changed by the expansion caused by the reduced pressure.

2. The manufacturing device as set forth in claim 1, wherein said driving means is a means for moving said movable wall in said directions, and wherein:
    said die has an outlet part which is long in the width direction of the foamy thermoplastic resin material;
    each of said walls in said pair of walls in said facing-wall section is a movable wall; and
    said driving means moves said movable walls to positions which are at equal distances from a reference position, the reference position being a central position of the foamy thermoplastic resin material at said outlet part in the thickness direction of the foamy thermoplastic resin material.

3. The manufacturing device as set forth in claim 1, further comprising temperature adjusting means for adjusting a temperature of said foamy thermoplastic resin material in said vacuum chamber.

4. The manufacturing device as set forth in claim 3, wherein:
    said temperature adjusting means includes a cooling medium path provided in inner walls of said vacuum chamber; and
    at least a part of the foamy thermoplastic resin material is in contact with the inner walls of said vacuum chamber.

5. The manufacturing device as set forth in claim 1, wherein said vacuum chamber includes an expanding zone for expanding the foamy thermoplastic resin material, and a cooling zone, provided behind said expanding zone, for cooling the foamed thermoplastic resin sheet obtained by expansion of the foamy thermoplastic resin material under a reduced pressure.

6. The manufacturing device as set forth in claim 5, further comprising temperature adjusting means for adjusting a temperature of said foamy thermoplastic resin material in said expanding zone.

7. The manufacturing device as set forth in claim 6, wherein:
    said temperature adjusting means includes a cooling medium path provided in inner walls of said vacuum chamber in said expanding zone; and
    at least a part of the foamy thermoplastic resin material is in contact with the inner walls of said vacuum chamber in said expanding zone.

8. The manufacturing device as set forth in claim 5, further comprising a cooling medium path provided in inner walls of said vacuum chamber in said cooling zone,
    wherein at least a part of the foamed thermoplastic resin sheet is in contact with the inner walls of said vacuum chamber in said cooling zone.

9. The manufacturing device as set forth in claim 1, wherein said die has an outlet part which is long in the width direction of the foamy thermoplastic resin material, said outlet part projecting to inside of said vacuum chamber.

10. The manufacturing device as set forth in claim 1, wherein:
    at least a part of walls enclosing said vacuum chamber is made of a material having a plurality of vacuum ports; and
    evacuation of said vacuum chamber is carried out through said material having vacuum ports.

11. The manufacturing device as set forth in claim 10, wherein said material having vacuum ports is a porous material.

12. The manufacturing device as set forth in claim 11, wherein said porous material is a porous electrocast shell.

13. The manufacturing device as set forth in claim 11, wherein said porous material is a sintered alloy.

14. The manufacturing device as set forth in claim 11, wherein the vacuum port of said porous material has a diameter of not more than 100 $\mu$m.

15. The manufacturing device as set forth in claim 14, wherein said porous material is a porous electrocast shell.

16. The manufacturing device as set forth in claim 14, wherein said porous material is a sintered alloy.

17. The manufacturing device as set forth in claim 1, wherein at least a part of surfaces of walls enclosing said vacuum chamber contains protuberances, so as to decrease an area of the sheet in contact with the wall surfaces when the sheet sent from said die to said vacuum chamber is transported through said vacuum chamber.

18. The manufacturing device as set forth in claim 17, wherein the protuberances of the wall surfaces are plated with polytetrafluoroethylene (Teflon).

19. The manufacturing device as set forth in claim 17, wherein the protuberances have curving surfaces.

20. The manufacturing device as set forth in claim 17, wherein:
   at least a part of the walls enclosing said vacuum chamber is made of a porous material; and
   evacuation of said vacuum chamber is carried out through said porous material.

21. The manufacturing device as set forth in claim 1, further comprising:
   adjusting means for reducing pressure in the vacuum chamber so as to become lower than the atmospheric pressure by not less than 100 mmHg and not more than 700 mmHg.

22. The manufacturing device as set forth in claim 17, further comprising:
   adjusting means for reducing pressure in the vacuum chamber so as to become lower than the atmospheric pressure by not less than 100 mmHg and not more than 700 mmHg.

23. The manufacturing device as set forth in claim 17, wherein the protuberances are formed so that an area of the surfaces of walls in contact with the foamy thermoplastic resin material should be not less than 10 percent and not more than 80 percent of an area in the case where the surfaces of walls do not have protuberances.

24. A manufacturing device of a foamed thermoplastic resin sheet, comprising:
   an extruder for melting and kneading a thermoplastic resin and a foaming agent to form a melted/kneaded mixture, and extruding the melted/kneaded mixture;
   a circular die provided at a front end of said extruder;
   means for cutting out a cylindrical foamy thermoplastic resin material extruded from said circular die, so as to form the cylindrical foamy thermoplastic resin material into a sheet form;
   a vacuum chamber in which the sheet form foamy thermoplastic resin material expands under a reduced pressure; and
   a facing-wall section composed of a pair of walls of said vacuum chamber which face each other in a thickness direction of the foamy thermoplastic resin material, at least one of the walls being a movable wall that is movable in directions in which said walls approach and separate each other, and is movable while staying in a parallel state with the other wall of said pair of walls.

* * * * *